(12) United States Patent
Schmackpfeffer et al.

(10) Patent No.: US 8,457,613 B2
(45) Date of Patent: Jun. 4, 2013

(54) AUTOMATED MOBILE INTELLIGENT COMMUNICATION PROCESSING SYSTEM

(75) Inventors: Craig S. Schmackpfeffer, Rochester, NY (US); Ross Shanken, San Diego, CA (US); James D. Shaffer, San Diego, CA (US); Alan C. Burye, San Diego, CA (US)

(73) Assignee: Neustar Information Services, Inc., Sterling, VA (US)

( * ) Notice: Subject to any disclaimer, the term of this patent is extended or adjusted under 35 U.S.C. 154(b) by 411 days.

(21) Appl. No.: 12/823,899

(22) Filed: Jun. 25, 2010

(65) Prior Publication Data

US 2011/0319061 A1 Dec. 29, 2011

(51) Int. Cl.
*H04M 3/42* (2006.01)
(52) U.S. Cl.
USPC .......... 455/415; 379/142.09; 379/142.03; 379/142.01; 379/88.21; 455/414.3; 455/414.4; 455/414.2
(58) Field of Classification Search
USPC .............. 455/415, 414.4, 414.3, 414.2
See application file for complete search history.

(56) References Cited

U.S. PATENT DOCUMENTS

| 7,167,907 | B2 | 1/2007 | Shaffer et al. | |
|---|---|---|---|---|
| 2007/0211873 | A1* | 9/2007 | Wang | 379/142.01 |
| 2009/0239553 | A1* | 9/2009 | Wright et al. | 455/456.3 |

FOREIGN PATENT DOCUMENTS

| KR | 10-2009-0120892 A | 11/2009 |
|---|---|---|
| KR | 10-2010-0035715 A | 4/2010 |
| KR | 10-2010-0060295 A | 6/2010 |

OTHER PUBLICATIONS

International Search Report and Written Opinion of the International Searching Authority mailed on Dec. 27, 2011 for related PCT Application No. PCT/US2011/40958 (in 9 pages).

* cited by examiner

*Primary Examiner* — Olumide T Ajibade Akonai
*Assistant Examiner* — Randy Peaches
(74) *Attorney, Agent, or Firm* — Procopio, Cory, Hargreaves & Savitch, LLC

(57) ABSTRACT

A system and method for providing enhanced information to a mobile communication device regarding a calling device is described. The system and method includes receiving an incoming call request at a mobile communication device including the identifier of the calling device. An information request is then formulated including the identifier of the calling device. The information request is transmitted from the mobile communication device to the query processing center via a data communication channel. A response is then obtained from the data processing center and transmitted to the mobile phone via the data communication channel. The response received from the data processing center includes the requested information related to the calling device.

15 Claims, 12 Drawing Sheets

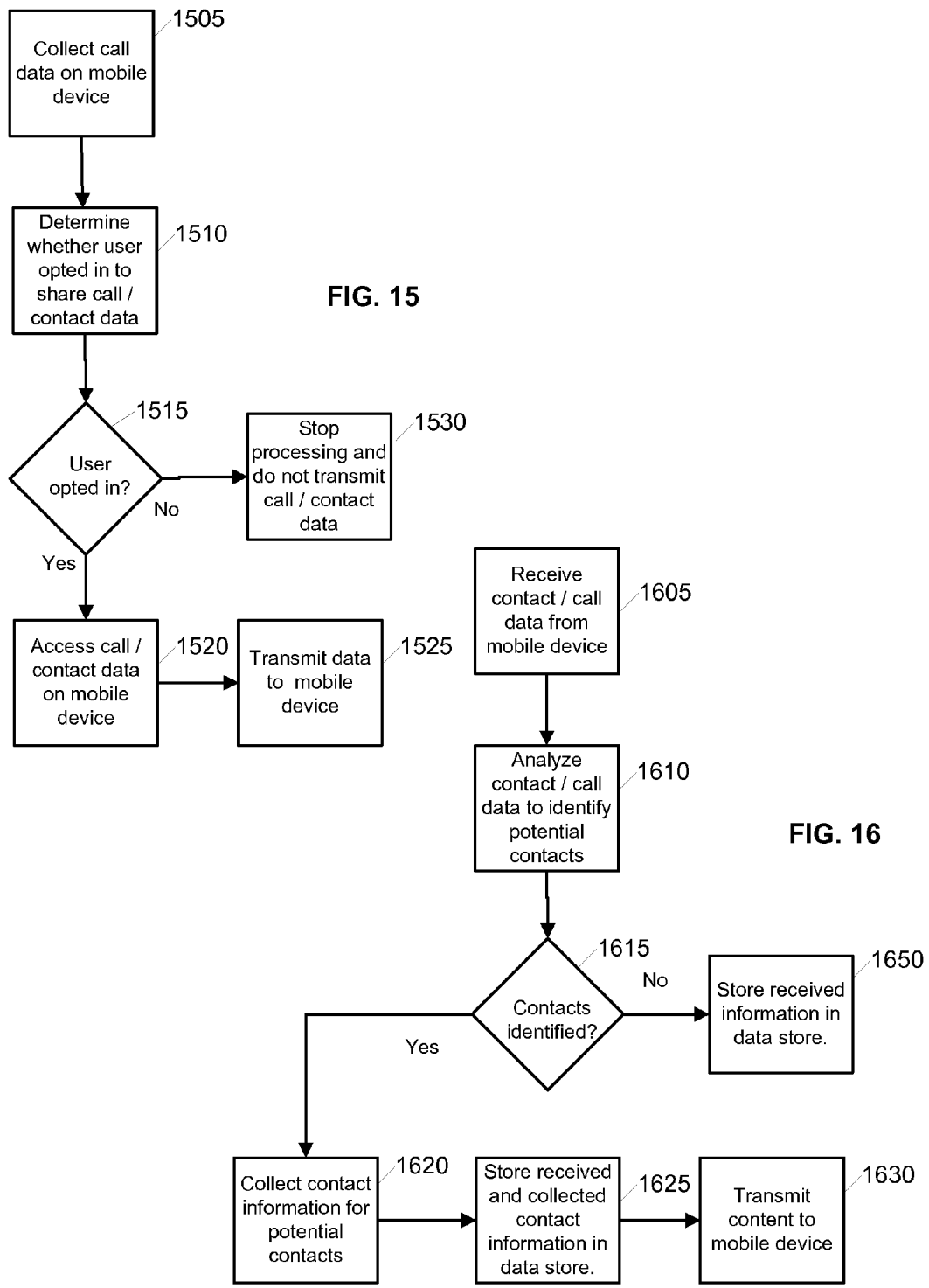

AUTOMATED MOBILE INTELLIGENT COMMUNICATION PROCESSING SYSTEM

FIELD OF THE INVENTION

This invention relates to mobile communication services and to a system and method for providing enhanced information to mobile devices and to providing information regarding a party communicating with a mobile communication device.

BACKGROUND

Since the beginning of civilization there has been an interest in acquiring information of human traffic to and from a territory. This is illustrated by watch towers, peep holes in doors and other devices used to gather information on an unannounced caller, for example. Over the last 50 years telephone networks have been used as a source of obtaining information about people. For example, in the United States, PSTN (Public Switched Telephone Network) has evolved from operators announcing callers to more automated systems like ANI (automatic Number Identification), Caller ID, CNAM (National Caller Name) and CNAP (Calling Name Presentation) that provide information about a caller to a called party.

Wireless programmable communication devices such as mobile phones, PDAs, including Mobile PCs, the RIM BlackBerry®, the Apple iPhone®, and personal mobile devices, such as laptop computers and the Apple iPad®, are used in conjunction with communication networks to provide caller identification information, for example telephone number, IP address or e-mail address. The caller identification information can be stored on a database, for example address books, of the wireless programmable communication devices. A network passed id of the caller device can be used to access the database stored on the mobile devices for accessing information on previous or known callers who can now be identified by name, picture or other identifiers means that is less cryptic than the telephone number or the network address id of the caller device.

Several milestones in the telecommunications industry, for example, the breakup of AT&T in 1984, further deregulation due to the Telecom Act of 1996 and the recent proliferation of multiple network types have resulted in a failure to provide adequate information about a calling party to a called party. Several new carriers and new service providers have evolved with varying technology and standards such that the information available to the called party about the calling party via their carrier or network provider is currently not always available and varies in quality.

Today from a practical perspective, the information available to a called party related to a calling party is a function of both parties devices, carriers/service providers, type of networks as well as the direct or indirect business relationship between the calling party's carrier/service provider and the called party's carrier/service provider.

Accordingly, there is a need for a system/method for a smart device with a network connection to identify a calling party that goes beyond information stored on the device stored on their device and independent of information that that can only be licensed from their carrier and/or network service provider.

SUMMARY

The present invention includes methods, apparatuses, and systems as described in the written description and claims.

Systems and methods are provided for providing enhanced information about a party sending a communication to a mobile device, such as a mobile telephone or other mobile communication device. For example, enhanced caller information can be provided about callers placing an incoming call to the mobile device. In another example, information about a party sending a text message, email, or other electronic communication to a mobile device can be obtained and displayed on the mobile device.

In one embodiment, a method for providing enhanced information to a mobile communication device regarding a calling device is provided. The method includes receiving an incoming call request at a mobile communication device including an identifier of the calling party, formulating a query for information related to the calling party that includes the identifier of the calling party, determining whether a communication channel is available to transmit the query for information to query processing server via the communication channel, and transmitting the information request from the mobile communication device to the query processing server via an available communication channel if a communication channel is available. The method further comprises storing the query for information in a data store on the mobile communication device if the communication channel is unavailable, monitoring the communication channel until the communication channel becomes available, transmitting the information request from the mobile communication device to the query processing server via the communication channel when the communication channel becomes available, and receiving a response including the requested information related to the calling party at the mobile communication device via the communication channel. According to some embodiments, the query can be stored on the mobile device regardless of whether the channel is unavailable, and in some embodiments the stored query information can be used to generate reporting and statistical information.

According to another embodiment, a method of providing enhanced information to a mobile communication device regarding a calling device wherein the mobile communication device receives the identifier of a calling device is provided. The method includes receiving a request for information from a mobile communication device over a communication channel, the request including an identifier of a calling device, accessing a local database and obtaining information related to the request using the identifier of the calling device, determining whether additional information is required from one or more remote third party data sources, requesting information related to the request from one or more remote third party data sources, receiving response information from the one or more remote third party data sources if additional information is required, correlating the response information from the third party data stores with information retrieved from the local database to generate a response to the request for information from the mobile communication device, and transmitting the response to the request for information to the mobile communication device via the communication channel. In an embodiment, the communication channel can be a data channel, while in other embodiments, the communication channel can be a voice channel, and in yet other embodiments, the communications channel can be a voice and data channel.

According to yet another embodiment, an automated mobile intelligent call processing device is provided. The device includes a telephony controller, an application programming interface (API) module, a data controller, a query module, and an off-call query module. The telephony controller is configured to receive an incoming call request from a calling device. The API module is configured to obtain notification of the incoming call request including the identifier of the calling device, to generate and forward the notification. The data controller is configured to establish and maintain communication via a communication channel. In an embodiment, the communication channel can be a data channel, while in other embodiments, the communication channel can be a voice channel, and in yet other embodiments, the communications channel can be a voice and data channel. The query module is coupled to the data controller and is configured to receive the notification from the API module, to formulate an information request including the identifier of the calling device, to establish a connection with the data controller to transmit the information request via the communication channel and to receive the obtained requested information via the communication channel, the obtained requested information including customized information related to the calling device. The off-call query module is coupled to the query module and configured to receive the identifier of the calling device from the query module if the communication channel was unavailable for transmitting the information request, to monitor the communication channel for availability, and to transmit the information request via the communication channel when the communication channel becomes available, to receive the requested information via the communication channel, and to store the requested information in a caller information data store.

According to yet another embodiment, an automated mobile intelligent call processing system is provided. The system includes a storage device, an information gateway module, and information application module, and a communication module. The storage device is used for storing records associated with multiple identifiers. The information gateway is coupled to the storage device and is configured to receive a request for information from a mobile communication device over a communication channel. In an embodiment, the communication channel can be a data channel, while in other embodiments, the communication channel can be a voice channel, and in yet other embodiments, the communications channel can be a voice and data channel. The request includes an identifier of a calling device. The information application module is coupled to the storage device and is configured to receive the identifier from the information gateway module, to access the storage device to obtain the requested information, to make a determination whether to access additional information from at least one third party data server, and to access the at least one third party data server if the information application module determines that additional information is necessary to satisfy the request for information. The information application module is further configured to correlate the information from the storage device and the at least one third party data server to generate the requested information. The communication module is coupled to the information application module and is configured to transmit the requested information relating to the calling device via the communication channel.

According to yet another embodiment, a method for providing enhanced information to a mobile device regarding a party to a communication with the mobile communication device is provided. The method includes receiving an incoming communication at the mobile device, the incoming communication including an identifier of the party sending the communication to the mobile device, formulating a query for information related to the party sending the communication that includes the identifier of the party, determining whether a communication channel is available to transmit the query for information to query processing server, transmitting the information request from the mobile communication device to the query processing server via the communication channel if the communication channel is available, storing the query for information in a data store on the mobile device if the communication channel is unavailable, monitoring the data communication channel until the communication channel becomes available, transmitting the information request from the mobile device to the query processing server via the communication channel when the communication channel becomes available, and receiving a response including the requested information related to the party sending the communication at the mobile device via the communication channel.

According to yet another embodiment, a method of providing enhanced information to a mobile device regarding a party to a communication with the mobile communication device. The method includes receiving a request for information from a mobile device over a communication channel, the request including an identifier of a contact for whom information is desired, accessing a local database and obtaining information related to the contact using the identifier from the request, determining whether additional information is required from one or more remote third party data sources, requesting information related to the contact from the one or more remote third party data sources if additional information is required, receiving response information from the one or more remote third party data sources, correlating the response information from the third party data stores with information retrieved from the local database to generate a response to the request for information from the mobile device, and transmitting the response to the request for information to the mobile device via the communication channel.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 15 is a flow diagram of a method for collecting call and/or contact information from a mobile device and pushing the data to the query server for analysis according to an embodiment; and FIG. 16 is a flow diagram of a process for identifying calling circles based on call and/or contact information collected from mobile devices.

DETAILED DESCRIPTION

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
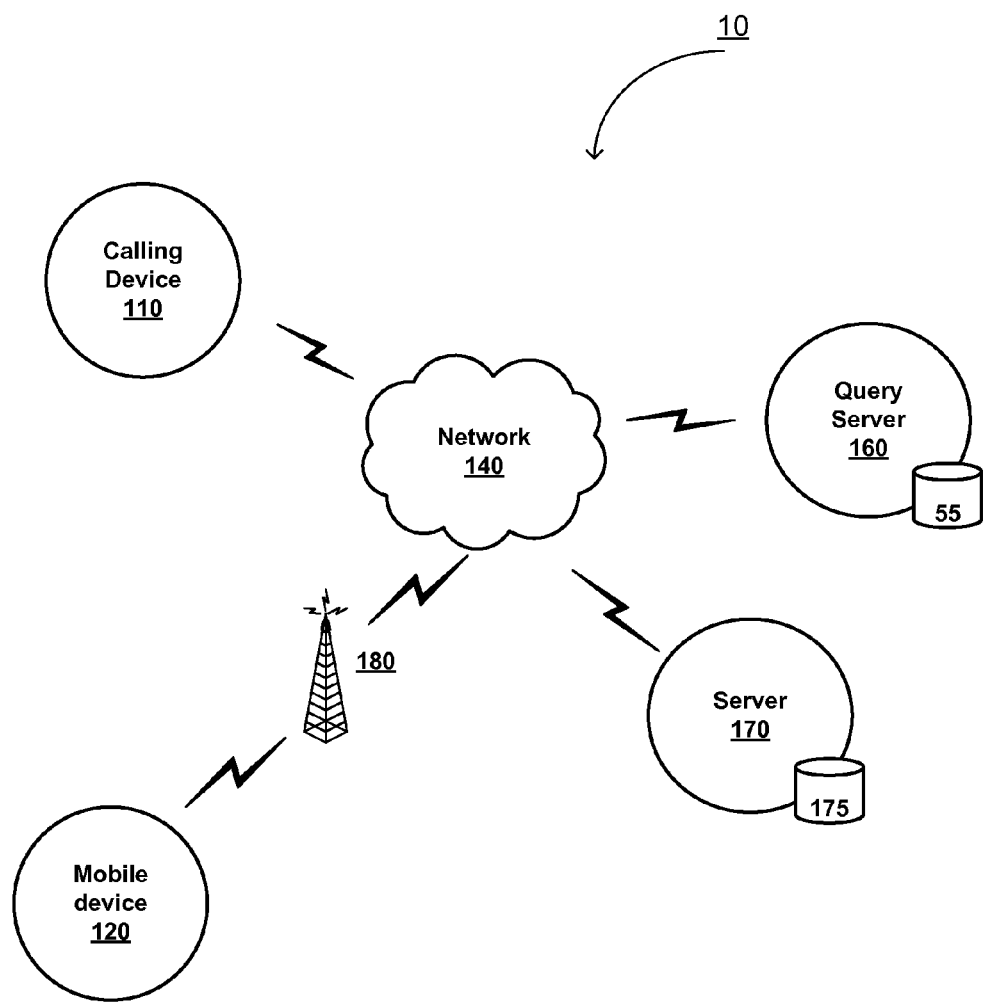
FIG. 1 is a high-level network diagram illustrating an example wireless system according to an embodiment.

In one aspect, a system and method for providing enhanced information to a mobile device is provided. FIG. 1 is a high-level network diagram illustrating an example communication system according to an embodiment. In general, one embodiment of the wireless system 10 includes a mobile or wireless device 120, a calling device 110, a network 140, a query server 160, a wireless base station 180 and storage device 55. The mobile device 120 communicates with the query server 160 via a wireless base station 180 and a network 140. The network 140 can be a combination of multiple communication networks.

The mobile device 120 can be any sort of mobile communication device with the ability to communicate within the wireless communication network 10. The mobile device 120 may also include a persistent storage area. For example, the mobile device 120 may be a mobile phone, a personal digital assistant ("PDA"), a portable computer with wireless connectivity (e.g. a laptop computer) or any other device configured for wireless communication. Calling device 110 can be any sort of device with the ability to communicate within the communication network and initiate a call with the mobile device 120. For example, the calling device 110 can be a mobile device 120, a wired computer or a plain old telephone.

The mobile device 120 and the wireless base station 180 can communicate by sending packets of information back and forth. Communications between the mobile device 120 and the wireless base station 180 can be governed by one or more protocols or standards such as Personal Communication Services ("PCS"), Global System for Mobile Communications ("GSM"), Code Division Multiple Access ("CDMA"), Wireless Fidelity ("WiFi"), Worldwide Interoperability for Microwave Access (WiMAX), Bluetooth, Voice Over Internet Protocol (VOIP), Wireless VOIP, Session Initiation Protocol (SIP) and other future protocols or standards, for example, Long Term Evolution (LTE). In one embodiment, the mobile device has the ability to communicate over a telephony channel (or voice communication channel) and a data communication channel at the same time. In some embodiments a single network can be utilized to carry voice and data information. Thus the mobile device can communicate both voice and data information over the single network at the same time.

Query server 160 can be implemented as a single computer or as a plurality of servers logically arranged. The multiple servers can be located in different locations and may support multiple protocols such as an ASCII GET data protocol, SS7 protocol, web services protocol, Voice Over Internet Protocol (VOIP), Wireless VOIP, Session Initiation Protocol (SIP) and other protocols. In the illustrated embodiment, query server 160 is coupled with a data storage area or system 55. The function of the query server 160 is preferably to receive requests or queries from the mobile device 120 and respond to those requests or queries by providing the mobile device 120 with information.

Third party data server 170 can also be implemented as a computer or a plurality of servers. The multiple servers can be located in different locations and may support multiple protocols such as an ASCII GET data protocol, SS7 protocol, web services protocol, Voice Over Internet Protocol (VOIP), Wireless VOIP, Session Initiation Protocol (SIP) and other protocols. In the embodiment illustrated in FIG. 1, the third party data server 170 is coupled with a data storage area or storage system 175. In an embodiment, the query server 160 can be configured to send requests for information to and receive information from the third party data server 170. According to an embodiment, the third party data server 170 can be an Internet-based information service provider, such as an online phone directory, a commercial information provider, a government or public information provider, and/or other type of third-party public or private information provider. For example, the third party information provider could be a government website or data store that includes publicly available information that includes phone numbers. This information can be correlated with a caller's number or other information, such as a name, address, other identifying information that can be extracted from a communication, to obtain information about the caller. In some embodiments, the third party data server 170 can be a social networking site, such as FACEBOOK, MYSPACE, BEBO, or other social networks that allow access to their users' information. In an embodiment, the query server 160 could initiate a search of the Internet or another public network for a caller's phone number or other identifying information and extract information about the caller from the search results. In some embodiments, the query server 160 can be configured to request information from multiple third party data server 170 and to correlate the information received from the multiple data sources into a set of information that can be provided to the called mobile device 120.

In an embodiment, the mobile device 120 can be configured to place and/or to receive calls and to send and/or to receive other types of communications. For example, the mobile device 120 can be configured to send and receive communications various types of communications, such as Short Message Server (SMS) messages or other types of text messages, email messages, Multimedia Message Services (MMS) messages for sending multimedia content to and from mobile devices, and other types of messaging service messages, such as messages to and from social networking sites.

For example, in one embodiment the mobile device 120 can receive a call from the calling device 110. The call is transmitted and processed by the network 140, for example, a telecommunications network including a Local Exchange Carrier (LEC) network and Long Distance Carrier (LDC) network. When the call is initiated by the calling device 110, the calling device identification information or source identification number, for example the caller's telephone number can be determined by the network 140. The caller's telephone number can be determined through a process called Automatic Number Identification (ANI), which the network 140, for example a telecommunications network, automatically performs when a caller initiates a call.

In an embodiment, the mobile device 120 receives a call signal or call initiation signal (from base station 180) which includes the calling device identification information or number (e.g. telephone number). The mobile device 120 then transmits a query to the query server 160. The query includes the calling device identification information or identifier. In response, the query server 160 processes the query and transmits information to the mobile device 120. The information received by the mobile device 120 can be displayed on the mobile device 120. The information transmitted by the query server 160 can be, for example, the caller's name. In an embodiment, the information is received before the call is answered at the mobile device 120.

In other embodiments, the mobile device 120 can be triggered to query for information based on other types of communications, such as text or SMS messages, email, VOIP calls, and/or other types of communications, to store this information in a contact data store on the mobile device 120, and to display this additional information to a user of the mobile device 120. For example, mobile device 120 can be configured to query for additional information, such as a caller name and picture of the caller in response to an incoming VOIP call. In a typical VOIP telephony application, only the username of the calling party is displayed to the recipient of the call. In another example, the mobile device 120 can be configured to query for additional information, such as a telephone number of a sender of an email when an incoming email is received. The mobile device 120 can be configured to query for various information based on user preference in response to various types of communications being received at or initiated at the mobile device 120. Some exemplary embodiments are discussed in detail below.

In some embodiments the mobile device 120 can be coupled to the network 140 via both a voice communication channel and a data communication channel. In those embodiments, the network 140 can include a telephony network and the internet. The voice communication channel can be a channel (i.e., a communication link or circuit) suitable for the transmission of speech data such as a cellular telephone communication channel. The data communication channel can be a communication channel or circuit provided for the exchange of data. The mobile device 120 can communicate with the query server 160 via the data communication channel. In some embodiments the query server 160 has no connection to the voice communication channels. Thus the incoming call may be received via a telecommunications network and a query or request from the mobile device 120 can be transmitted over a second network link, for example the data communication channel including the internet, to the query server 160. In other embodiments the mobile device 120 can use a single network to carry voice and data.

According to some embodiments, the configuration of the module device 120 and/or the network 140 can prevent the mobile device 120 from being able to communicate on both the data communication channel and the voice communication channels simultaneously. For example, in CDMA-based networks currently cannot handle simultaneous voice and data connections. In an environment where the mobile device 120 cannot use simultaneous voice and data connections, the mobile device 120 is prevented from communicating with the query server 160 when an incoming call is being received, and thus, the mobile device 120 cannot submit a query to the query server 160 to obtain information about the caller. According to an embodiment, the mobile device 120 can be configured include a query data store for storing queries to the query server until a data connection can be established. Once a data connection can be established, the mobile device 120 can submit the query to the query server 160. The mobile device 120 can then store the information provided by the query server 160 in response to the query in a caller information data store that can be used to identify a caller the next time that the party places a call to the mobile device 120.

This solution can also be used for mobile devices that can establish both voice and data connections simultaneously. For example, a mobile device 120 that can support simultaneous data and voice connections could be located in part of a mobile provider's network where data services are either permanently or temporarily unavailable. For example, the mobile device 120 could be located in a geographic area where the mobile provider's network only provides voice connectivity or in a portion of the mobile provider's network where data connectivity is temporarily unavailable due to an outage. The mobile device 120 can generate a query when a call is received from a caller whose information is not in currently stored in the caller information data store. The query can then be stored in the query data store until a data connection becomes available. According to an embodiment, a query stored in the query data store can be marked with an expiration date and/or time. If the query is not completed by the expiration date and/or time, the query can be removed from the query data store.

It should be noted that many components that are included in the elements of FIG. 1 and the subsequent figures have been omitted to make the descriptions more clear. One will note that these omitted elements such as additional base stations, networks, processors, network ports, memories, buses, transceivers, etc., would be included in such elements in a manner that is commonly known to those skilled in the art.

Figure 2:
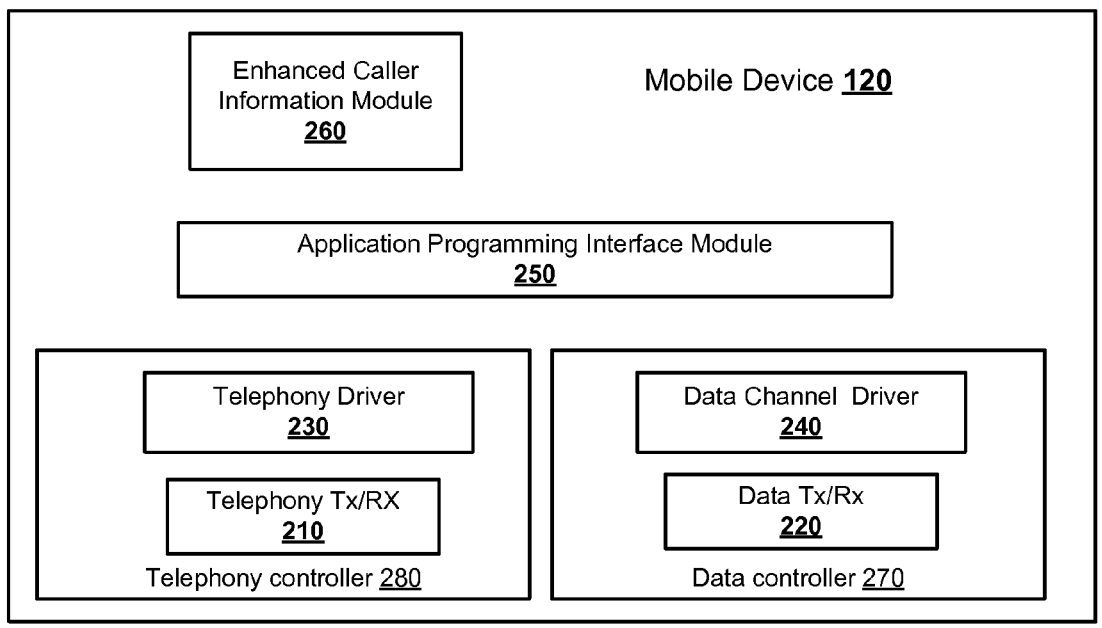
FIG. 2 is a block diagram illustrating selected functional element of a mobile device according to an embodiment.

FIG. 2 is a block diagram illustrating selected functional element of a mobile device according to an embodiment. The mobile device 120 can be commercially available mobile communication device with voice and data communication capabilities with the enhancements described herein. In the illustrated embodiment, the mobile device 120 includes a telephony controller 280, a data controller 270, an Application Programming Interface (API) module 250 and an Enhanced Caller Information Module (ECIM) 260. Other functional elements typically included with such a mobile device have been omitted for clarity.

The telephony controller 280 includes a telephony transceiver 210 and a telephony driver 230. The telephony transceiver 210 in combination with the telephony driver 230 handle typical cellular telephone functions, including, for example, registration, call set up and hand-off. The data controller 270 includes a data transceiver 220 and a data channel driver 240. The data transceiver 220 in combination with the data channel driver 240 handle data communication functions. For example, the functions associated with establishing and using a WiMAX or WiFi network for internet access. The API module 250 provides an interface for applications, such as the ECIM 260, to interact with low level functions such as hardware drivers (e.g., telephony driver 230 and the data channel driver 240). The API module (or functionality) 250 can be provided by a mobile operating system, for example, Windows Mobile 5.0, a BREW (binary runtime environment for wireless), JAVA, Linux, Microsoft Mobile, or other API and may use features and functions available on the mobile device 120 not available through such API(s).

The ECIM 260 can receive notification from the API module 250 when a request for an incoming call is received by the telephony controller 280. As described above, the mobile device 120 can also be configured to notify the ECIM 260 when other types of communications, such as text message, MMS message, emails, or VOIP calls are received at or initiated at the mobile device 120. The ECIM 260 can also generate an information request as will be described in more detail below. The ECIM 260 can be a plug-in application that is downloaded to the mobile device 120 from a website, for example. The website can be provided by the query server 160 or a separate server. The plug-in application can be downloaded wirelessly or via a personal computer ("PC"), for example.

Figure 3:
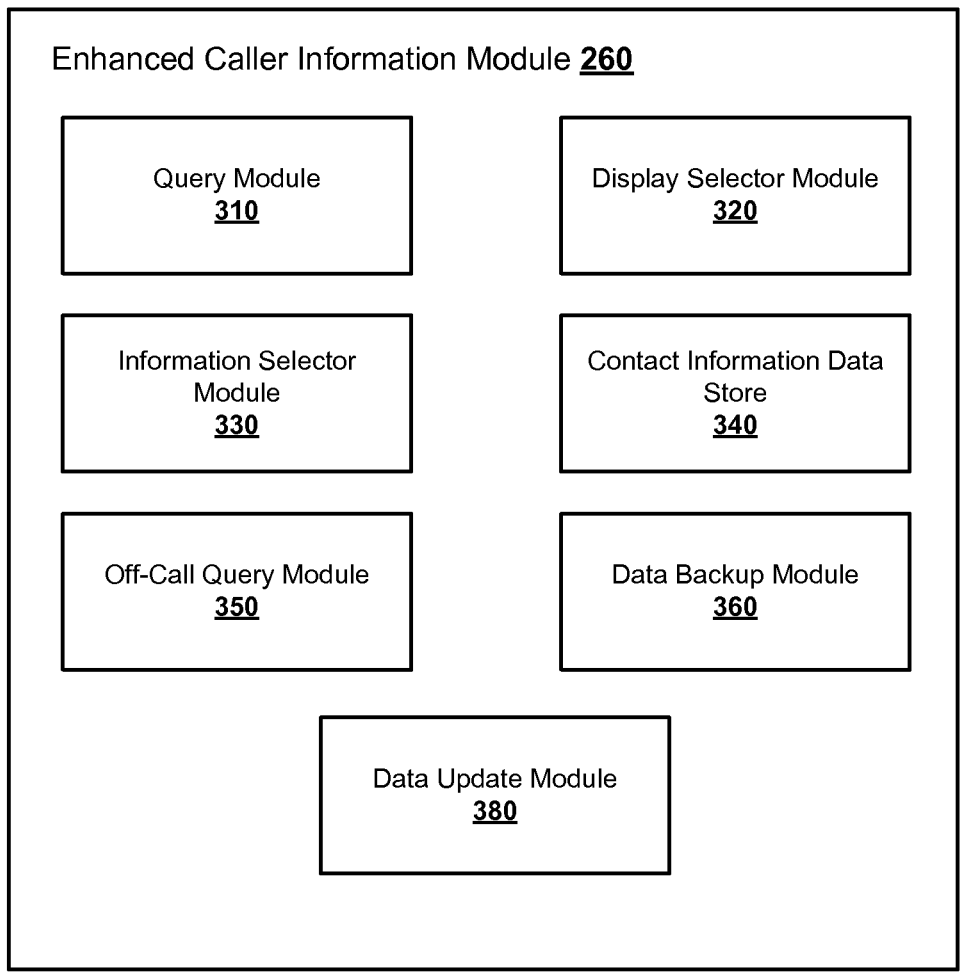
FIG. 3 is a block diagram of an Enhanced Caller Information Module according to an embodiment.

FIG. 3 is a functional block diagram of the Enhanced Caller Information Module 260 of FIG. 2 according to an embodiment. For explanatory purposes, FIG. 3 will be discussed with reference to the device depicted in FIG. 2. The Enhanced Caller Information Module 260 includes a query module 310, a display selector module 320, and an information selector module 330. The query module 310 receives notifications from the API module 250 illustrated in FIG. 2 above. For example, the query module 310 can receive a notification from the API module 250 when a request to initiate an incoming call is received by the mobile device 120. The query module 310 can also generate information requests and transmit the request via the data channel established and maintained by the data controller 270. The data connection or channel can be an ongoing data connection for the mobile device 120 or can be established to communicate information request from the query module 310 as needed.

The display selector module 320 selectably determines whether information received at the ECIM 260 is displayed or stored by the mobile device 120. The display selector generates a user interface which receives user input to select options for displaying and/or storing obtained requested information. For example, a user may select to display only portions of the requested information received at the ECIM 260, to display the entire information received or to save the received information in memory.

According an embodiment, the display selector module 320 is configured to determine which data is displayed in response to various types of communications. For example, in an embodiment, the display selector module 320 can provide a user interface that allows a user to select the type of information that will be displayed for various types of communications. For example, a user might want to have the name and picture (if available) of an incoming caller be displayed. In another example, a user might configure the display selector module 320 to display the name and username for callers participating in a VOIP call. In yet another example, a user might want to have the name, email address, and telephone number of a party from which an email has been received display n the mobile device. One skilled in the art will recognize that these examples are merely several possible combinations of features and that the display selector module 320 can be configured to display other combinations of information according to other embodiments.

The information selector module 330 defines the type of information request to be sent. In one embodiment the information selection module 330 generates a user interface which receives user input to select options for the type of information to be requested. In other embodiments the selection is made when the ECIM 260 is downloaded to the mobile device 120. In an embodiment, the user can select to request at least a portion of information relating to the calling device, for example, or decline such a request as a call is being received. That allows a user to decide for which incoming calls to request information. In an embodiment, the user can also select to request at least a portion of information relating to other types of incoming communications as well or decline the request as the incoming communication is received. For example, in an embodiment, the user can decide not to request information for a particular email address with which the user is already familiar when an email is received from that address.

The contact information data store 340 is a data store stored in a persistent memory of the mobile device 120. The contact information data store 340 can include information that was received from the query server 160 in response to a query from the mobile device 120. According to an embodiment, the caller information stored in the caller information data store 120 can include an expiration date that indicates when the data is no longer valid. For example, in an embodiment, the caller information can include an expiration date after which the entry can be automatically deleted from the contact information data store 340. In some embodiments, the query server can be configured to look for caller information stored in the caller information data store and to use that information if a match is found, rather than submitting a query to the query server 160.

An embodiment, the mobile device 120 can be configured to provide an enhanced contact book user interface that allows a user to browse through the information stored in the contact information data store 340. The interface can also be configured to allow the user to delete entries in the contact information data store 340. In an embodiment, the interface can also be configured to allow the user to select an entry to create a permanent entry in a phone book or contact list data stored in a persistent memory on the mobile device using information from the entry in the contact information data store 340. According to an embodiment, the Enhanced Caller Information Module 260 can be configured to first look in the contact list or phone book of the mobile device or a contact information data store maintained by the ECIM 260 to determine whether information for the caller already exists on the mobile device 120 and to display that information to user of the mobile device rather than submitting a query to query server 160. In some embodiments, the Enhanced Caller Information Module 260 can also be configured to submit a query to query server 160 for each incoming call or other communication regardless of whether the information is already stored on the mobile device in the phone or contact list or other local data store.

According to an embodiment, the query module 310 can be configured to determine whether a communication channel is available to send the query to the query server 160. In some embodiments, the query module 310 can be configured to send the query over a data communication channel. In other embodiments, the query module 310 can be configured to send the query over a voice channel. In yet other embodiments, voice and data communications can be transmitted over the same channel and the query module 310 can be configured to determine whether a voice and data channel is available.

According to an embodiment, the query module 310 can be configured to determine whether a communication connection is currently available, and if a connection is not available, to generate a query and provide the query to off-call query module 350 for later processing. According to some embodiments, the mobile device 120 may not be able to use a data channel if a voice channel is already in use. For example, if an incoming call is received by a mobile device 120 that cannot use data and voice channels simultaneously, such as a CDMA-based device, the query module 310 cannot submit a query for caller information to query server 160 if a request to request to initiate an incoming call has been received over the voice channel or when a call is currently in progress. A request to initiate a call could be received while another call is already ongoing via a call waiting feature, and the query module 310 could not submit a query to query server 160 to request caller information if the mobile device is unable to use voice and data channels simultaneously.

According to an embodiment, the query module 310 can be configured to first inspect the local contact list or phone book on the phone to determine whether an entry exists that is associated with a caller. The query module can be configured to inspect the contents of the contact information data store 340 if there is not an entry in the contact list or phone book of the mobile device, and to formulating a query to be submitted to the query server 160 if there is not an entry in the contact list or the contact information data store 340.

Off-call query module 350 can be configured to store the queries received from the query module 310 in a query data store in the memory of mobile device 120 until a data channel becomes available or until the query expires. According to an embodiment, the memory can be a persistent memory, such as flash memory, a hard-disk drive, or other type of persistent memory. According to an alternative embodiment, the off-call query module 350 can be configured to store a calling device identification number or identifier, for example, telephone number of the calling device 110, an email address of a sender of an email message, a username of a user from a social networking site, or other information. According to an embodiment, the off-call query module 350 can monitor for the availability of a communication channel and send queries stored in the mobile device to query server 160 once a communication channel becomes available. In an embodiment, the off-call query module can be configured to monitor for the availability of a data channel and to transmit the query to the query server 160 upon availability of the data channel. According to another embodiment, the off-call query module 350 can be scheduled to periodically check for availability of a data channel and to submit pending queries to the query server 160 if an available data channel is found.

Data backup module 360 can be configured to access the contact information data store 340 and/or a contact list or other contact information on the mobile device 120 and push the data to query server 160 for backup. The query server 160 can be configured to provide a remote backup of the contact information stored on the mobile device. The contact information stored up on the query server 160 can be used provide a backup of the contact information in the event that a user loses or damages the mobile device, such that the contact information would otherwise be lost. In an embodiment, the data backup module 360 can be configured to run periodically to push the contact information data stored on the mobile device 120. In another embodiment, the data backup module 360 can provide a user interface that allows a user of mobile device 120 run a data backup on demand or to load the contact information stored on the query server 160. In an embodiment, the data backup module 360 can receive the backed up data requested from the query server 160 and create entries in the contact list of the mobile device 120 or the contact information data store 130 based on the backup information.

Data update module 380 can be configured to receive updated contract information pushed by the query serve 160 to the mobile device 120. In an embodiment, the data update module 380 can update the information in the contact list of the mobile device 120 and/or in the contact information data store 340. According to an embodiment, the data update module 380 can be configured to include a user interface that allows a user of the mobile device 120 to request from the query server 160 a backup copy of contact information stored on the query server. The data update module 380 can also be configured to provide a user interface that allows the user to resolve conflicts in the contact information on the mobile device and the backup contact information received from the query server 160. For example, if a contact exists on the mobile device and in the received backup information but a portion of the contact information, such as an email address or phone number does not match up between the two versions of the contact information, the user interface can be configured to allow the user to select which version of the data to keep on the mobile device. The user interface can also allow the user to merge the two versions of the data by selecting data from each version that should be kept in the contact information on the mobile device. For example, the user might decide to keep the email address for a contact that was stored on the mobile device, but to update the contact information on the mobile device with the telephone numbers and address from the backup contact information received from the query server 160.

Figure 4:
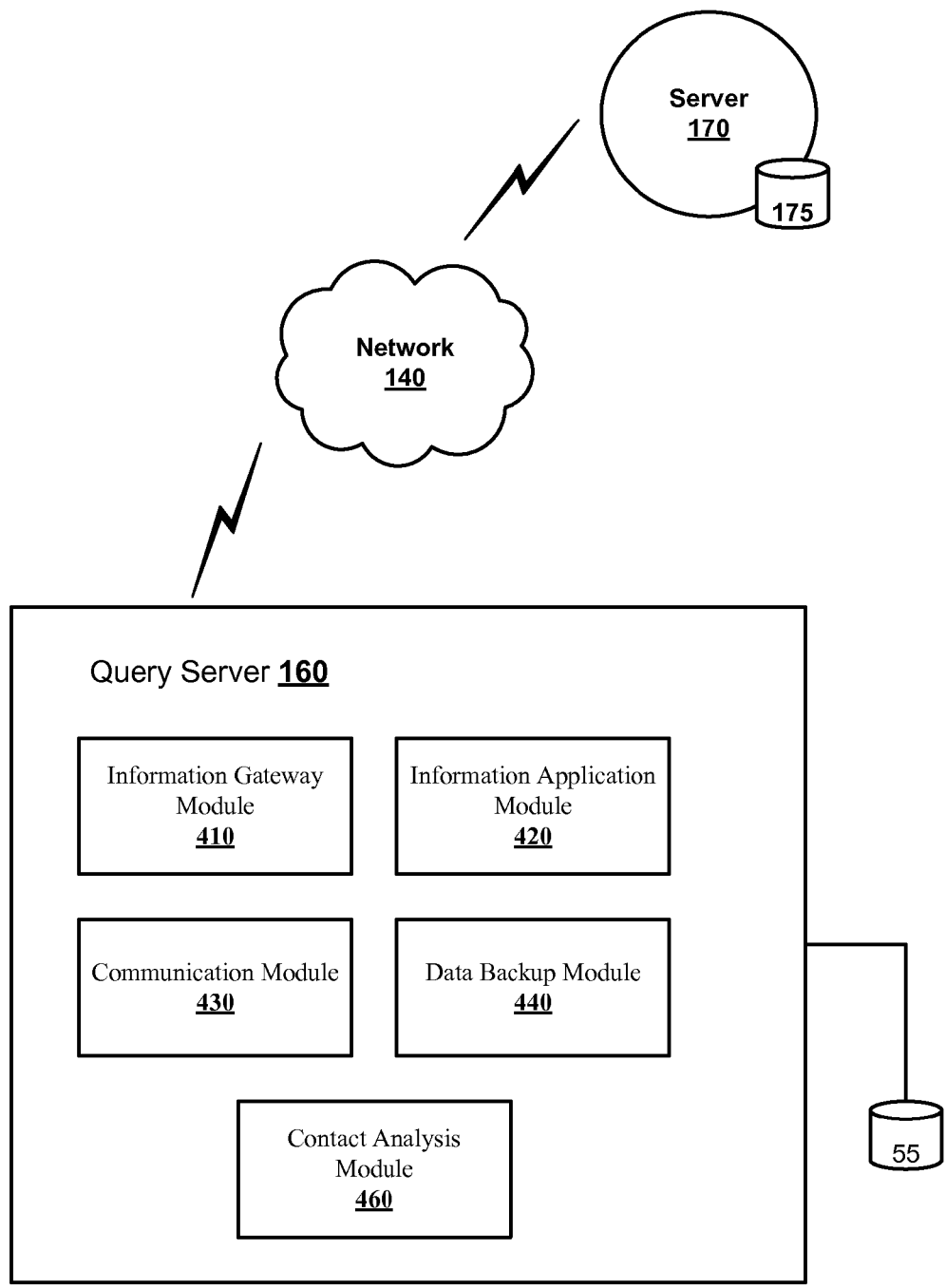
FIG. 4 is a block diagram of a query server according to an embodiment.

FIG. 4 is a functional block diagram of the query server 160. For explanatory purposes, FIG. 4 will be discussed with reference to the above-discussed FIG. 1. The query server 160 can include an information gateway module 410, an information application module 420 and a communication module 430. As was noted above the query server can be implemented as one or more servers or computers. As illustrated in FIG. 1, the query server 160 may be coupled to the storage device 55. In some embodiments the storage device 55 is incorporated into the query server 160. One embodiment of a system that can be used to implement the server 160 and storage device 55 is described in U.S. Pat. No. 7,167,907 hereby incorporated by reference.

In an embodiment, the storage device 55 can store information relating to caller devices (and users of caller devices). For example, the storage device can include a list of names indexed by telephone numbers. In one embodiment, the information is telecommunications carrier independent records. In one embodiment the calling device identification number includes a telephone number of the calling device 110. The database or storage device 55 can include a virtual telephone number database including a master list of telephone numbers with thousands of attribute data items. The database or storage device may be updated frequently by querying, for example the SS7 network, for wireless telephone numbers from wireless carriers.

In some embodiments, the storage device 55 can store contact information about parties with whom the user of mobile device 120 communicates. As described above, the mobile device 120 can be configured to place and/or to receive calls and to send and/or to receive other types of communications. For example, the contact information can include information about parties with whom the user of the mobile device communicates via SMS messages or other types of text messages, email messages, MMS messages, and other types of messaging service messages, such as messages to and from social networking sites.

The information gateway module 410 can be coupled to the storage device 55 and configured to receive a query or request for information from devices such as the mobile device 120 over a data communication channel. The query or request for information can include a calling device identification number or identifier, for example, telephone number of the calling device 110, an indication of the information requested and an identifier of the requesting party. For example, the query or request for can include a network address for the calling device such as an Internet Protocol (IP) address, or a hardware identifier, such as a Media Access Control (MAC) address.

In some embodiments, the query or request can include other information that can be used to identify a contact for which the mobile device 120 has requested additional information to be displayed to the user of the mobile device. For example, in one embodiment, the query or request can include the email address of a contact for which information is being requested while in another embodiment, the query or request can include a VOIP service username or identifier associated with a contact for which the information is being requested.

The information gateway module 410 can authenticate the requester of information and can also perform billing functions such as tracking requests by customer or subscriber. In one embodiment the information gateway module 410 authenticates the requester by accessing a verification file or table to validate the requester. The verification table may include a list of telephone numbers and names associated with the requester, where the requester is, for example, a mobile device and/or subscriber.

The information application module 420 is coupled to the information gateway module 410 and receives the calling device identification number of the calling device 110 or other contact information included in the query or request from the information gateway module 410. The information application module 420 accesses the records in the storage device 55 using the calling device identification number or other contract information to obtain the requested information pertaining to the contact, such as calling party information, information about the calling device 110, information associated with an email address, VOIP service username, or other contact information. In some embodiments the calling device identification number is associated with the requested information via an algorithm that uses the calling device identification number to compute the location in memory of requested information in the storage device. In other embodiments, an algorithm can be applied to contact information, such as an email address or VOIP service username, to compute a location in memory of the requested information in the storage device.

According to some embodiments, the information application module 420 can be configured to access one or more third party data servers 170 across network 140 in order to obtain information about a contact for which information has been requested. The information application module 420 can submit a query to the third party data server 170 that includes the calling device identification number and/or other contact information received in the request from the mobile device 120. The third party data server 170 can then correlate the telephone number or other contact information with records stored in the data store 175 to determine whether any information is available related to the calling device identification number or other contact information that was included in the request from the mobile device 120.

According to an embodiment, the information application module 420 can be configured to determine whether to access data from the third party data server 170. In one embodiment, the information application module 420 can be configured to access the third party data server 170 only if no contact information is found in the storage device 55 for a particular request received from the mobile device 120. In other embodiments, the information application module 420 can be configured to access the third party data server 170 can be configured access the third party data server 170 each time that a request is received.

In yet another embodiment, the information for each contact in the storage device 55 can include a data and timestamp, and the information application module 420 can be configured to access the third party data server 170 to determine if more up to date information is available for the contact if the information in the storage device 55 is older than a predetermined threshold. For example, the information application module 420 can be configured to access content from the third party data store 170 in response to a request from the mobile device 120 if the content in the storage device 55 is more that 10 days old. In yet another embodiment, if the contact information in storage 55 is obtained from multiple third party data servers 170, the content from each third party data server 170 can be marked with a date and timestamp, and the information application module 420 can be configured to access the content from those third party data servers 170 for which the content is older than a predetermined threshold in response to requests from the mobile device 120.

According to an embodiment, the information application module 420 can be configured to store the results of the query to the third party data server 170 in the storage device 55 so that the information that was obtained from the at least one third party data store 170 is available for responding to future queries from a mobile device 120 without having to resubmit a query to the at least one third party data store 170.

In an embodiment, the request from the mobile device 120 can include a calling device identification number can be the telephone number associated with the calling device. The query to the third party data server 170 can identify records in the data store 175 that include the telephone number and return those records or a portion thereof to the query server 160. In other embodiments, the request from the mobile device 120 can include other contact information, such as an email address, VOIP service username, and/or other information. The query to the third party data server 170 can identify records in the data store 175 that include this contact information.

The information application module 420 can be configured to parse the information received from the third party data server to extract information about the contact for which the mobile device 120 requested information, such as the contact's name, address, email address, social network username, demographic information, and/or other information. According to some embodiments, the information application module 420 can be configured to submit requests to a plurality of third party data servers 170 and to correlate the information received back from the plurality of third party data servers 170 to create a set of information related to calling device or calling party.

The communication module 430 is coupled to the information application module 420 and transmits the requested information (data) pertaining to the calling device via a communication channel. According to some embodiments, the communication channel is a data communication channel, while in other embodiments the communication channel can be a voice channel, or a combined voice and data channel.

Alternatively, in some embodiments the response to the request can be sent as a short message service (SMS) communications protocol message that allows the interchange of short text messages between mobile devices 120 or an email. The response to the request can also be sent as a (VOIP), Wireless VOIP, Session Initiation Protocol (SIP) etc. In some embodiments a single network can be utilized to carry voice and data information. Thus the voice communication can be received over the single network and the request for information and response can also be transmitted and received by the mobile device 120 over the single network.

Data backup module 440 can be configured to receive contact information transmitted by the mobile device 120 to the server 160. In an embodiment, the data backup module 440 can store the backed up contact information in storage device 55. Data backup module 440 can also be configured to receive requests from the mobile device 120 to provide backed up contact data and to transmit the backed up contact data to the mobile device via network 140.

In another embodiment, the data backup module 440 can be configured to push updated contact information to the mobile device 120. For example, if the information application module 420 can be configured to identify a telephone number that has been disconnected and to update contact that reference that number. In an embodiment, information application module 420 can be configured to identify changes in information regarding a contact on the mobile device 120 and to store the updated content information in the storage device 55. In one embodiment, the information application module 420 can be configured to perform queries to gather information from one or more third party data servers 170. The information application module 420 can be configured to perform queries related to contacts in contact information associated with mobile device 120.

Contact analysis module 460 can be configured to identify devices or contacts that may contact the mobile device 120 at some point in the future. The contact analysis module can instruct the information application module 420 to perform queries to gather information related to the potential the contact and push the collected information to the mobile device 120. Mobile device 120 can be configured to add any new or updated contact information to the contact information data store so the contact information is available for future display. The call or other communication information and/or contact information can be analyzed by the query server 160 to develop calling circles or calling clusters, that represent groups of people that may not have been in direct contact with one another but have one or more common contacts which may indicate that these parties are likely to contact each other in the future. While these groups are referred to herein as calling circles or calling clusters, other types of communications besides call can be made between the parties and parties can be included in a cluster or circle based on other types of communications, such as email messages, text messages, or other communication types.

Various information can be provided to the query server 160 by the data backup module 360 of the mobile device. This information can include contact information stored on the mobile device 120 including information stored in the contact information data store 340. This information can also include information about incoming and/or outgoing communications. For example, the information might include call log information, and information about incoming our outgoing text messages, email messages, and/or other types of communications. The contact analysis module 460 can also be configured to develop calling circles or clusters based on requests for information about a party to a communication that were received by the information gateway module 410. The contact analysis module 460 can also use a combination of the various sources of information described above to develop circles or clusters of parties that communication with one another.

In some embodiments, users of the mobile device 120 must opt in before any contact or communications information can be sent to the query server 160. In embodiments where the user has opted out of the sending information to the query server 160 and/or to where the mobile device is not configured to collect and send this information to the query server 160, the requests for information about a party to a communication that were received by the information gateway module 410 can be analyzed to identify calling circles or clusters.

Figure 5:
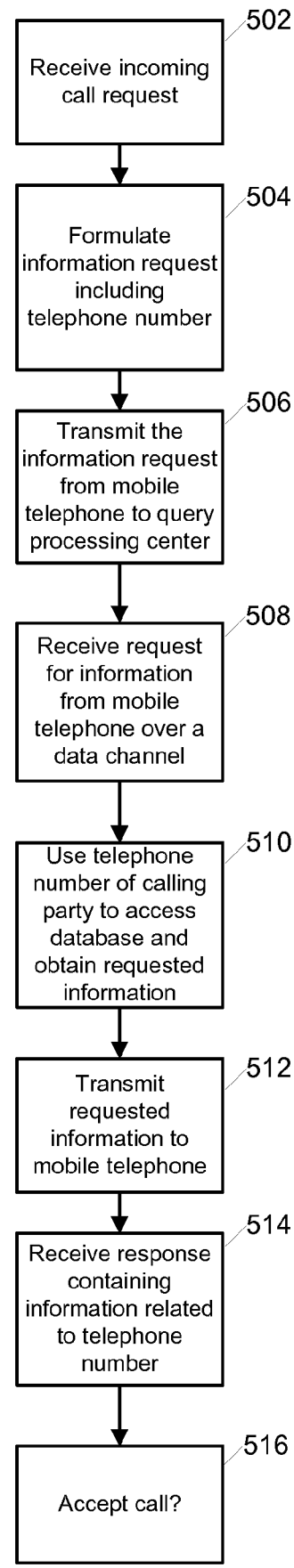
FIG. 5 is a flow diagram of a process of providing enhanced information to a mobile communication device regarding a calling device according to an embodiment.

FIG. 5 is a flow diagram of a process of providing enhanced information to a mobile communication device regarding a calling device according to an embodiment. The steps of this process can be implemented in the mobile device 120 of FIG. 2 and the query server 160 of FIG. 4. The steps of the process can be performed in "real time," after the caller has initiated a call from the calling device 110 and while the call is still active or before the voice connection is completed.

At step 502 the process starts with receiving an incoming call request at the mobile device 120 including the telephone number (or identifier) of the calling device. The calling party may initiate the call from the calling device 110 illustrated in FIG. 1 above. When the call is received at the mobile device 120 illustrated in FIG. 1, the ECIM 260 is notified of the call by the API module 250. The notification may include forwarding the telephone number of the calling device to the ECIM 260.

The process then continues to step 504 where an information request is formulated including the telephone number of the calling device. In some embodiments the information selector module 330 can prompt the user to select between several options including whether to request information or to specify the type of information desired by the user in relation to the calling device before the query is completed. Thus a user may select to request the name or email of the calling party and not the address of the calling party, for example. The request may include a user identifier or license ID, a request ID, a service key and a return network address. The return network address can include, for example, a phone number or an internet protocol address. The service key may be the calling device identification number. The user or license ID may be linked to the calling device identification number or network address of the mobile device that may be obtained during a registration process. The user or license ID may be included as part of a downloadable plug-in ECIM application. The number of queries afforded to a user may be limited by the license available to the user. For example, the license may be limited based on how many queries a user can make during the license period or may have duration constraints.

In step 506, the request from the mobile communication device 120 is transmitted to a query processing center via the data communication channel. The query processing center includes a query server 160, illustrated in FIG. 1 above, for processing the request and obtaining a response. At step 508, the request is received at the query processing center. The process then continues to step 510, where the telephone number of the calling device is used to access the database or storage device to verify the user's license and to obtain the requested information. According to an embodiment, the query server 160 can be configured to make a determination whether information to access data from one or more third party data servers 170. As described above, the query server 160 can be configured to make a determination whether to access one or more third party data servers 170 in order to obtain information about the calling party. The information obtained being the requested information pertaining or relating to the calling device. In step 512, the requested information obtained from the database can transmitted to the mobile phone via the data communication channel (or by SMS or email). In step 514, the requested information can be received by the ECIM 260. In one embodiment, the user can accept or reject the call based on the information received in step 516.

Figure 6:
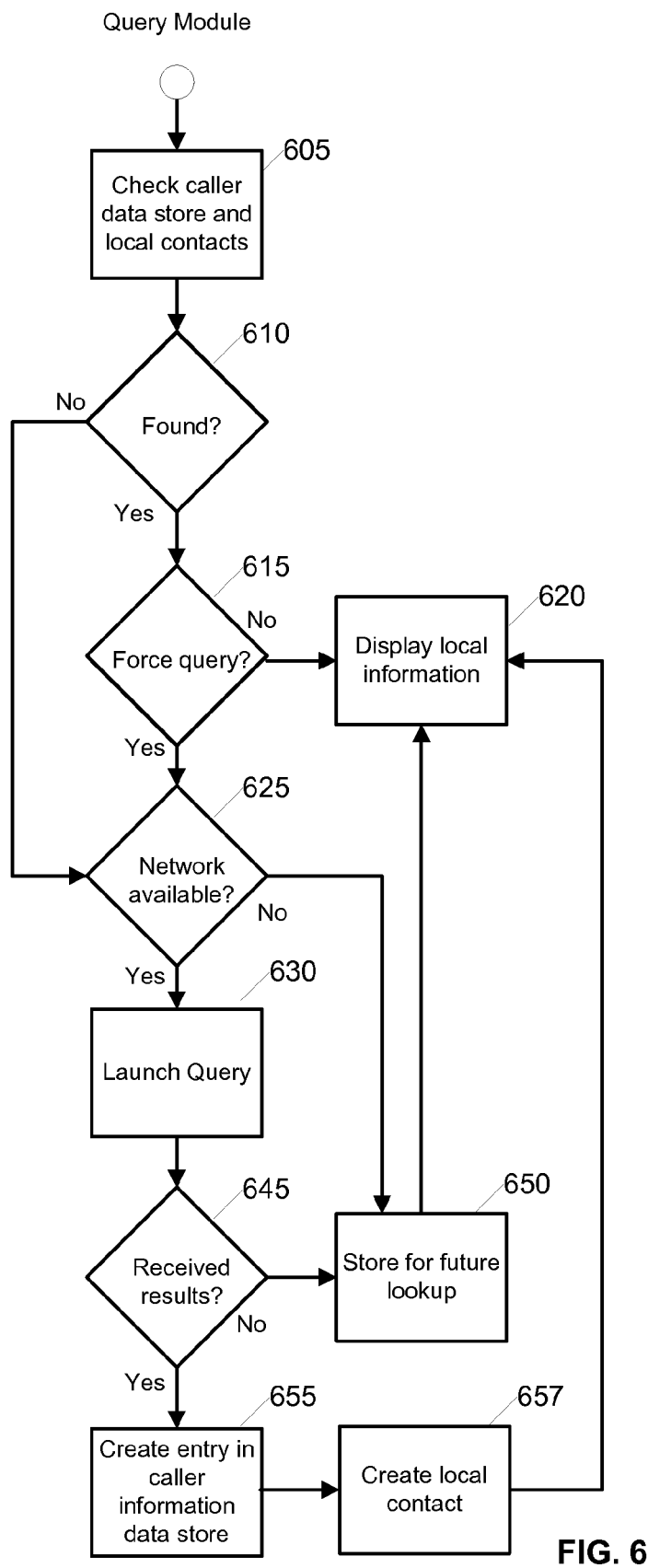
FIG. 6 is a flow diagram of a method for providing enhanced caller information to a mobile device according to an embodiment.

FIG. 6 is a flow diagram of a method for providing enhanced caller information to a mobile device according to an embodiment. In an embodiment, the query module 310 of the Enhanced Caller Information Module 260 can implement the method illustrated in FIG. 6. According to an embodiment, if the mobile device can be configured to support multithreaded applications, the method illustrated in FIG. 6 can be implemented in a service thread of the ECIM 260 that can be executed on a processor of the mobile device 120 when an incoming call request is received. In other embodiments, an asynchronous state machine can be used to implement the method illustrated in FIG. 6.

When the ECIM 260 is notified that an incoming call request has been received at the mobile device 120, the ECIM 260 can be configured to first search the local contact list or phone list stored in the phone and the contact information data store 340 for information previously received from the query server 160 to see if information related to the calling party is already available on the phone (step 605). In an embodiment, the ECIM 260 can be configured to select the information for the caller from one of these local data stores for display to the user of the mobile device 120 rather than submitting a query to the query server 160 to obtain information about the caller.

A determination is made whether the caller information has been found in memory on the mobile device 120 (step 610). If caller information has been found on the local device, a determination can be made whether to force the query to be submitted to the query server 160 even though caller information was found locally on the mobile device 120 (step 615). According to an embodiment, the ECIM 260 can be configured to force a query to be submitted to the query server 160. For example, the ECIM 260 can be configured to force a query to be submitted to the query server 160 for all incoming calls. In an embodiment, the mobile network provider can configure the mobile device 120 to submit a query to query server 160 for all incoming calls. In an embodiment, the mobile network provider 160 could provide an enhanced caller identification service to which customers can subscribe, and the mobile network provider can configure the ECIM 260 module of the mobile devices of the subscribers to submit a query for each incoming call regardless of whether the mobile device 120 already has a local copy of caller information. According to another embodiment, the ECIM 260 can be configured to force a query to be submitted for some incoming call requests. For example, the local caller information can have an expiration date or a last updated date associated with the information. If the locally stored information is older than a predetermined threshold (e.g., one month), the ECIM 260 can be configured to submit a query to the query server 160 for caller information in order to ensure that the caller information stored locally on the mobile device 120 remains current. In yet other embodiments, the ECIM 260 can be configured to force a query to be performed for callers in specific area codes, callers in a specific geographic area or state, and/or other criteria. In some embodiments, the ECIM 260 can provide a user interface on the mobile device that allows the user to configure the criteria is used to determine whether to force a query to be submitted to query server 160 for an incoming call request.

If the query is not to be forced, the display selector module 320 of the ECIM 260 can then display the local caller information on the mobile device 120 (step 620). Otherwise, if the caller information was not found on the local device or the ECIM 260 is configured to force the query to be submitted for the incoming call request, the query module 310 can make determination whether a communication channel of the network is available for sending the query to the query server 160 (step 625). According to an embodiment, a determination can be made whether a data channel is available for sending the query to the query server 160. As described above, a data channel may be unavailable if a voice channel is currently in use in some embodiments, such as in some CDMA-based mobile networks. A data channel might also be unavailable if the mobile device 120 is a portion of the mobile network that does not provide data service or where the data service is currently unavailable. In some embodiments, a voice channel can be used to send the data from the mobile device 120 to the query server 160. If a communication channel is unavailable, the query module 310 can provide the telephone number or other identifier of the incoming caller to the off-call query module 350 for later processing (step 650). According to an embodiment, the query module can store the query information in the query data store whether the communication channel is available or not, and the query information can be used for later analysis and reporting. According to an embodiment, a query stored in the query data store can be marked with an expiration date and/or time. If the query is not completed by the expiration date and/or time, the query can be removed from the query data store.

If the network is available, the query module 310 can submit a query to the query server 160 for caller information (step 630). Once the query has been submitted, the ECIM 260 can be configured to wait for a period of time for query results to be received from the query server 160. A determination is made whether the query results have been received (step 645). According to an embodiment, the ECIM 260 can be configured wait a predetermined amount of time before making the determination whether the query results have been received. If the query results are not received by the mobile device 120, the query can be provided to the off-call query module to be stored for later processing (step 650) and the off-call query module 350 can attempt to resubmit the query to the query server 160 at a later time.

Otherwise, if the query results are received by the mobile device 120, the query results can be added to the contact information data store 340 (step 655), and in some embodiments, the query results can be used to create an entry in the contact list or phone book of the mobile device 120 (step 657). The display selector module 320 of the ECIM 260 can then display the caller information on the mobile device 120 (step 620). In an embodiment, the caller information can be displayed in real-time on a display of the mobile device if the results are received in step 645 before the call request times out. In another embodiment, the ECIM 260 can be configured to display the caller information on the user device as a "missed" call if the user does not answer the call before the call request times out.

Figure 7:
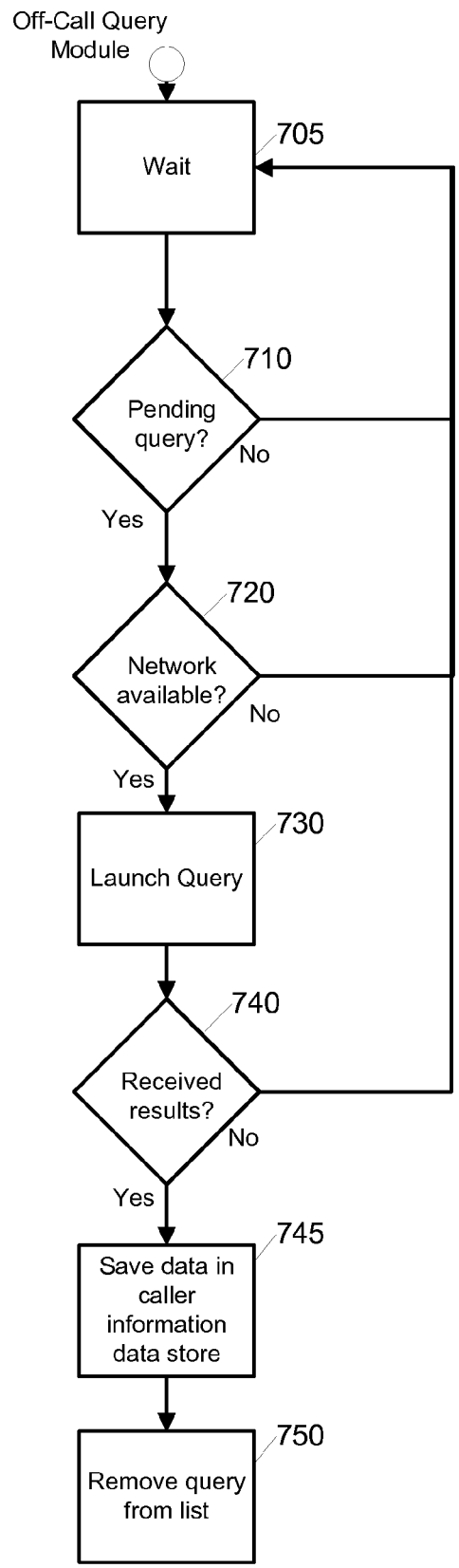
FIG. 7 is a flow diagram of a method for handling offline queries for caller information according to an embodiment.

FIG. 7 is a flow diagram of a method for handling offline queries for caller information according to an embodiment. In an embodiment, the off-call query module 350 of ECIM 260 can implement the method illustrated in FIG. 7. As described above, off-call query module 350 can be configured to store queries received from the query module 310 in a data store until a communication channel becomes available for sending the query to the query server 160. In some embodiments, the off-call query module 350 waits until a data communication channel is available to submit the query to the query server 160. In an embodiment, if the mobile device is configured to support multithreaded applications, the method illustrated in FIG. 7 can be implemented in an offline query thread of the off-call query module 350 that is executed on a processor of the mobile device 120.

The off-call query module 350 can be configured to periodically check to see if any queries are pending in the query data store. The off-call query module 350 can be configured to wait until a predetermined amount of time has passed (step 705) before making a determination whether there are any pending queries stored in the query data store of the off-call query module 350 (step 710). If a query is pending in the data store, a determination is made whether a channel of the network is available over which the off-call query module 350 can transmit the query to the query server 160 (step 720). As described above, in some embodiments, the query module can be configured to submit queries to the query server 160 via a data communication channel and the data communication channel may be unavailable if a voice channel is currently in use in some embodiments, such as in some CDMA-based mobile networks. A data channel might also be unavailable if the mobile device 120 is a portion of the mobile network that does not provide data service or where the data service is currently unavailable. If a communication channel is unavailable, the off-call query module 350 can be configured to once again wait for a predetermined amount of time before resuming processing (step 705).

If the network was available, the off-call query module 350 can be configured launch the query (step 730). In some embodiments, the off-call query module 350 can submit the query to query server 160. In an alternative embodiment, the off-call query module 350 can provide the query or the telephone identifier stored in the off-call query module data store to the query module 310 to be submitted query server 160.

Once the query has been submitted, the off-call query module 350 can be configured to wait for the query results to be received from the query server 160. A determination is made whether the query results have been received (step 740). According to an embodiment, the off-call query module 350 can be configured to wait a predetermined amount of time before making the determination whether the query results have been received. If the query results are not received by the mobile device 120, the off-call query module 350 can return to the wait state (step 705) and attempt to resubmit the query again later. Otherwise, if the query results are received, the query results can be added to the contact information data store 340 (step 745), or in another embodiment, the query results can be used to create an entry in the contact list or phone book of the mobile device 120. The off-call query module 350 can then remove the query or the telephone number from the off-call query module data store (step 750) so that the off-line query off-call query module 350 will not attempt to resubmit a query to the query server 160 for the caller information that was just received.

Figure 8:
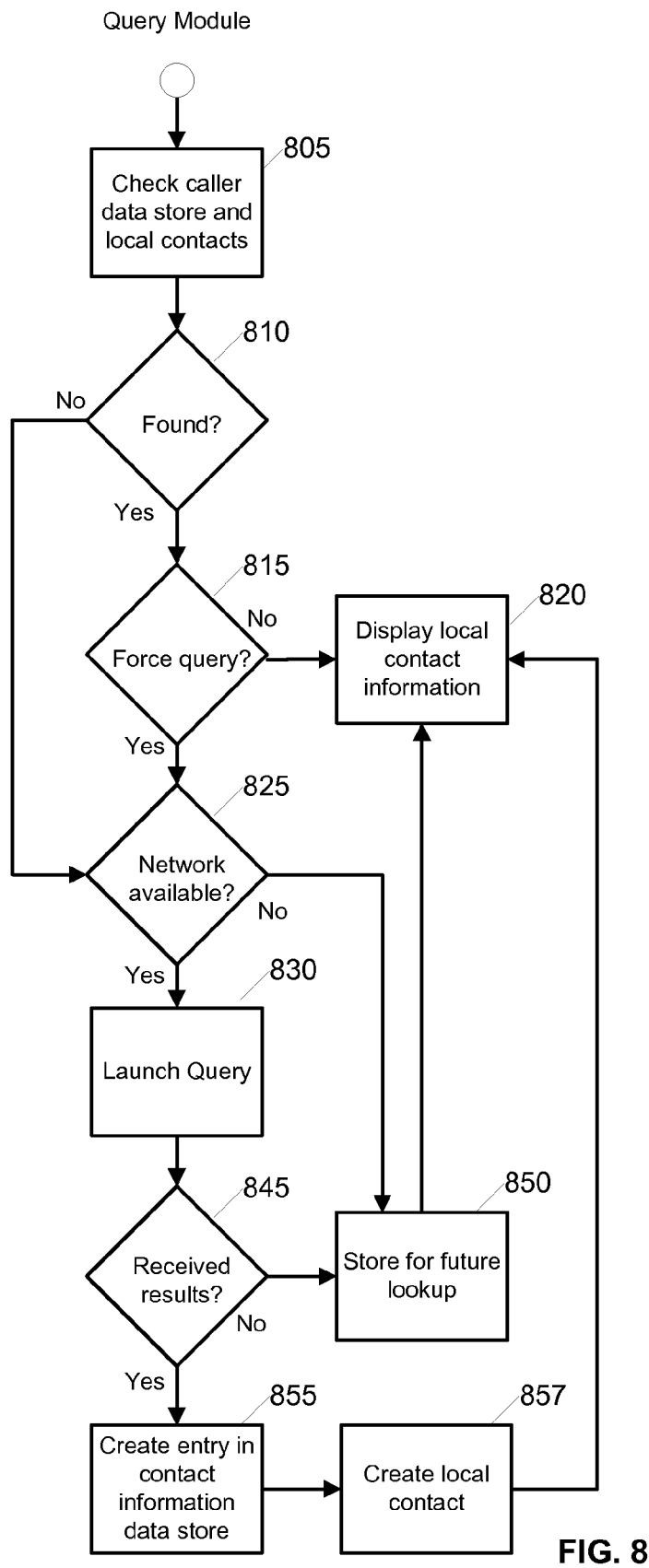
FIG. 8 is a flow diagram of a method for providing information to a mobile device about a party sending a communication to the mobile device according to an embodiment.

FIG. 8 is a flow diagram of a method for providing information to a mobile device about a party sending a communication to the mobile device according to an embodiment. The method illustrated in FIG. 8 is similar that illustrated in FIG. 6, except the ECIM 260 is not limited to providing information about a caller to a mobile phone. Instead in some embodiments, the ECIM 260 can be configured to obtain information about senders and/or receivers of other types of communications. For example, the ECIM 260 can be configured to obtain and store information about senders or recipients of Short Message Server (SMS) messages or other types of text messages, email messages, Multimedia Message Services (MMS) messages for sending multimedia content to and from mobile devices, and other types of messaging services, such as incoming messages from social networking sites. The ECIM 260 can also collect and display information regarding parties to a voice over IP (VOIP) service call using services such as Skype®, or other similar types of services. Contact information data store 340 that can be used to store contact information collected for inbound and/or outbound communications can be included in the ECIM 260. The information in the contact information data store 340 is not merely limited to caller information, but can instead be used for storing other information, such as names, photos, address information, ages, email address, telephone number, and/or other information that can be associated with a contact. In the embodiments where the other types of communications are used, requests to the query server for information about an incoming communication may including information about a communicating device rather than a calling device, since these forms of communication do not necessarily involve a party placing a call to another device.

According to an embodiment, if the mobile device is configured to support multithreaded applications, the method illustrated in FIG. 8 can be implemented in a service thread of the ECIM 260 that can be executed on a processor of the mobile device 120. In other embodiments, an asynchronous state machine can be used to implement the method illustrated in FIG. 8.

The ECIM 260 can be configured to be notified of incoming or outbound communications and to determine whether information related to the parties included in the communication is already available on the phone (step 805). For example, if an incoming text or SMS message is received, the ECIM 260 can be configured to look up information about the sender in the contact information data store 340. In another example, if an incoming message from a social network site is received, the ECIM 260 can be configured to load additional information, such as sender's name, a photo, or other inform the from the contact information data store 340. In yet another example, for either an incoming or outbound VOIP call, the username of the parties to the call are all that is typically displayed on the user's device. Additional information, such as name, pictures, and/or other information regarding the parties to the call can be stored in the contact information data store 340 and accessed by the ECIM 260 when the mobile device is involved in a VOIP call. In each of these examples, the ECIM 260 can be configured to access the contact information data store 340 to retrieve information regarding the parties to the communication that can be displayed to the user of the mobile device, without having to submit a query to query server 160 in order to obtain information about the parties to the communication.

A determination is made whether the information has been found in memory on the mobile device 120 (step 810). If information has been found on the local device, a determination can be made whether to force the query to be submitted to the query server 160 even though caller information was found locally on the mobile device 120 (step 815).

According to an embodiment, the ECIM 260 can be configured to force a query to be submitted to the query server 160. For example, the ECIM 260 can be configured to force a query to be submitted to the query server 160 for all or some types of incoming communications. For example, in an embodiment, the mobile network provider can configure the mobile device 120 to submit a query to query server 160 for all incoming communications. In an embodiment, the mobile network provider 160 could provide an enhanced caller information service to which customers can subscribe, and the mobile network provider can configure the ECIM 260 of the mobile devices of the subscribers to submit a query for each incoming communications regardless of whether the mobile device 120 already has a local copy of information about the parties to the communication.

According to another embodiment, the ECIM 260 can be configured to force a query to be submitted for some incoming call communications. For example, the contact information stored in contact information data store 340 can have an expiration date or a last updated date associated with the information. If the locally stored information is older than a predetermined threshold (e.g., one month), the ECIM 260 can be configured to submit a query to the query server 160 for contact information in order to ensure that the contact information stored locally on the mobile device 120 remains current. In yet other embodiments, the ECIM 260 can be configured to force a query to be performed for callers in specific area codes, callers in a specific geographic area or state, and/or other criteria. In other embodiments, the ECIM 260 can be configured to force a query to be performed for certain types of communications, such as messages received from a social networking site or for participants of a VOIP call. In some embodiments, the ECIM 260 can provide a user interface on the mobile device that allows the user to configure the criteria is used to determine whether to force a query to be submitted to query server 160 for a communication.

If the query is not to be forced, the display selector module 320 of the ECIM 260 can then display the locally obtained information on the mobile device 120 (step 820). Otherwise, if the caller information was not found on the local device or the ECIM 260 is configured to force the query to be submitted for the incoming call request, the query module 310 can make determination whether a communication channel of the network is available (step 825). According to an embodiment, a determination can be made whether a data channel is available for sending the query to the query server 160. As described above, a data channel may be unavailable if a voice channel is currently in use in some embodiments, such as in some CDMA-based mobile networks. A data channel might also be unavailable if the mobile device 120 is a portion of the mobile network that does not provide data service or where the data service is currently unavailable. In some embodiments, a voice channel can be used to send the data from the mobile device 120 to the query server 160. If a communication channel is unavailable, the query module 310 can provide the telephone number, username, email address, or other identifier of a party to a communication to the off-call query module 350 for later processing (step 850). According to an embodiment, a query stored in the query data store can be marked with an expiration date and/or time. If the query is not completed by the expiration date and/or time, the query can be removed from the query data store.

Once the query has been submitted, the ECIM 260 can be configured to wait for a period of time for query results to be received from the query server 160. A determination is made whether the query results have been received (step 845). According to an embodiment, the ECIM 260 can be configured wait a predetermined amount of time before making the determination whether the query results have been received. If the query results are not received by the mobile device 120, the query can be provided to the off-call query module to be stored for later processing (step 850) and the off-call query module 350 can attempt to resubmit the query to the query server 160 at a later time.

Otherwise, if the query results are received by the mobile device 120, the query results can be added to the contact information data store 340 (step 855), and in some embodiments, the query results can be used to create an entry in the contact list or phone book of the mobile device 120 (step 857). The display selector module 320 of the ECIM 260 can then display the information about the participants of the communication on the mobile device 120 (step 820). In an embodiment, the contact information can be displayed in real-time on a display of the mobile device if the results are received in step 845 before an incoming communication notification period expires. In some embodiments, the ECIM 260 can provide a user interface that allows the user to configure the notification period timeouts for different types of incoming communications. For example, the user might want to have enhanced contact information displayed for an incoming email or text message if the enhanced contact information is received from the server for up 20 seconds after the mobile device has received the email message. In another example, a user might configure the ECIM 260 to display enhanced contact information for an incoming VOIP call up until the incoming call request expires (e.g., the incoming call times out, the calling party gives up, or the call is diverted to voice mail or similar service where the caller can leave a message for the called party). In another embodiment, the ECIM 260 can be configured to display the contact information on the user device as a "received" or "missed" communication (depending on the type of communication) if the user does not view or otherwise access the incoming communication before the incoming communication notification period expires. For example, in an embodiment, if the user receives an incoming email message or text message, the enhanced contact information received from the query server 160 can be added to a list of received but not yet viewed communications on the mobile device. Similarly, in an embodiment, if an incoming VOIP call is missed, the enhanced contact information for the caller can be added to a list of missed calls on the mobile device. The list of missed or received communication can include an identifier that identifies the type of incoming communication.

Figure 9:
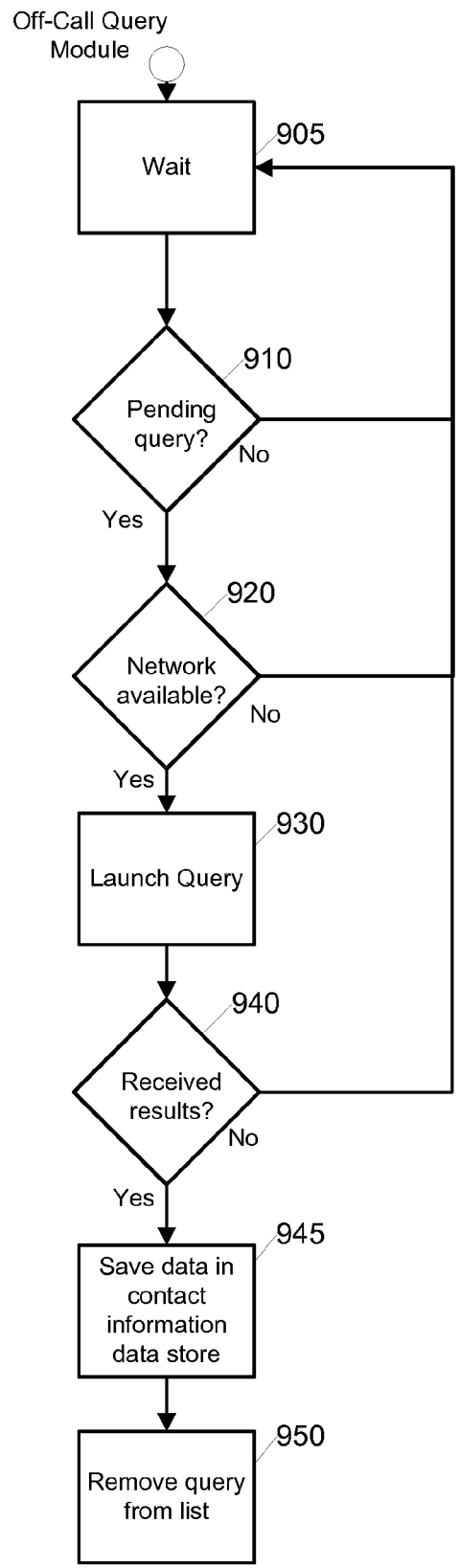
FIG. 9 is a flow diagram of a method for handling offline queries for information regarding a party sending a communication to a mobile device according to an embodiment.

FIG. 9 is a flow diagram of a method for handling offline queries for information regarding a party or parties to a communication for a mobile device according to an embodiment. The method illustrated in FIG. 9 is similar to the method illustrated in FIG. 7, except that the ECIM is not limited to providing information about a caller to a mobile communication device, such as a mobile phone. Instead, as described with respect to FIG. 8, the ECIM 260 can collect a variety of different types of information and store that information in the contact information data store 340 depending upon the type of communication that is undertaken.

As described above, off-call query module 350 can be configured to store queries received from the query module 310 in a query data store until a communication channel becomes available. In some embodiments, the query module 310 is configured to store queries in the query data store until a data communication channel becomes available. In an embodiment, if the mobile device is configured to support multithreaded applications, the method illustrated in FIG. 7 can be implemented in an offline query thread of the off-call query module 350 that is executed on a processor of the mobile device 120.

The off-call query module 350 can be configured to periodically check to see if any queries are pending in the query data store. The off-call query module 350 can be configured to wait until a predetermined amount of time has passed (step 905) before making a determination whether there are any pending queries stored in the query data store of the off-call query module 350 (step 710). If a query is pending in the data store, a determination is made whether a communication channel of the network is available (step 920). As described above, in some embodiments, the query module can be configured to submit queries to the query server 160 via a data communication channel and the data communication channel may be unavailable if a voice channel is currently in use in some embodiments, such as in some CDMA-based mobile networks. A data channel might also be unavailable if the mobile device 120 is a portion of the mobile network that does not provide data service or where the data service is currently unavailable. If the network is unavailable, the off-call query module 350 can be configured to once again wait for a predetermined amount of time before resuming processing (step 905).

If the network was available, the off-call query module 350 can be configured launch the query (step 930). In some embodiments, the off-call query module 350 can submit the query to query server 160. In an alternative embodiment, the off-call query module 350 can provide the query or the other identifier, such as an email address, username, telephone number, etc. stored in the off-call query module data store to the query module 310 to be submitted query server 160.

Once the query has been submitted, the off-call query module 350 can be configured to wait for the query results to be received from the query server 160. A determination is made whether the query results have been received (step 940). According to an embodiment, the off-call query module 350 can be configured to wait a predetermined amount of time before making the determination whether the query results have been received. If the query results are not received by the mobile device 120, the off-call query module 350 can return to the wait state (step 905) and attempt to resubmit the query again later. Otherwise, if the query results are received, the query results can be added to the contact information data store 340 (step 945), or in another embodiment, the query results can be used to create an entry in the contact list or phone book of the mobile device 120. The off-call query module 350 can then remove the query or the other identifier from the off-call query module data store (step 950) so that the off-line query off-call query module 350 will not attempt to resubmit a query to the query server 160 for the contact information that was just received.

Figure 10:
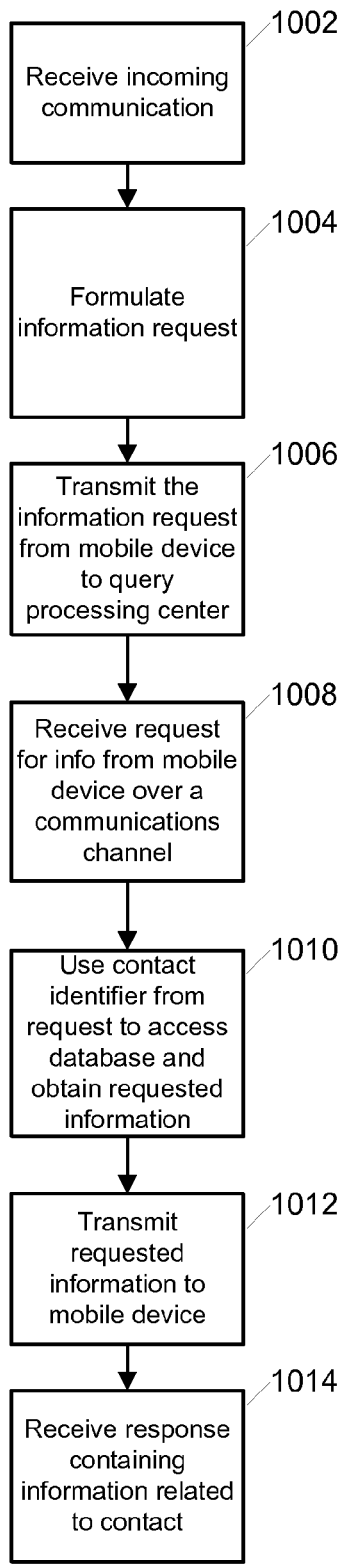
FIG. 10 is a flow diagram of a process of providing enhanced information to a mobile device regarding a party sending a communication to the mobile device according to an embodiment.

FIG. 10 is a flow diagram of a process of providing enhanced information to a mobile device regarding a contact with which a user of the mobile device is in communication according to an embodiment. The method illustrated in FIG. 10 can be used with conjunction with the methods illustrates in FIGS. 8 and 9 for processing requests for contact information from a mobile device. The steps of this process can be implemented in the mobile device 120 of FIG. 2 and the query server 160 of FIG. 4. The steps of the process can be performed in "real time," as a communication, such as an SMS, MMS, or email message is received by the mobile device 120. The steps of this process can also be performed as incoming VOIP call is received by a VOIP service application running on the mobile device 120.

At step 1002 the process starts with receiving a communication at the mobile device 120. The mobile device 120 can be configured to receive various types of communications, such as text or SMS messages, email, VOIP calls, and/or other types of communications including telephone calls. According to some embodiments, the receipt of an incoming communication is optional, and the process illustrated in FIG. 10 can be initiated by an outgoing communication from the mobile device 120. For example, in one embodiment, the user of the mobile device can initiate a VOIP call to one or more parties using a VOIP service application being executed by the mobile device 120. The user of mobile device 120 can enter one or more VOIP usernames of parties to be called, and the mobile device 120 can look up and display information associated with the usernames of the parties to be called.

The process then continues to step 1004 where an information request is formulated including the contact information identifying the contact for which additional information is desired. For example, in one embodiment, the request can include the email address of a contact for which information is being requested while in another embodiment, the request can include a VOIP service username or identifier associated with a contact for which the information is being requested. In some embodiments the information selector module 330 can prompt the user to select between several options including whether to request information or to specify the type of information desired by the user in relation to the contact before the query is completed. Thus a user may select to request the name or email of the calling party and not the address of the calling party, for example. The request may include a user identifier or license ID, a request ID, a service key and a return network address. The return network address can include, for example, a phone number or an internet protocol address. The service key may be the calling device identification number. The user or license ID may be linked to the calling device identification number or network address of the mobile device that may be obtained during a registration process. The user or license ID may be included as part of a downloadable plug-in ECIM application. The number of queries afforded to a user may be limited by the license available to the user. For example, the license may be limited based on how many queries a user can make during the license period or may have duration constraints.

In step 1006, the request from the mobile device 120 is transmitted to query server 160 of a query processing center via a communication channel. In some embodiments, the communication channel is a data channel, while in other embodiments, the communication channel is a voice channel or a channel that can be used for both data and voice communications. At step 508, the request is received at the query server 160. The process then continues to step 1010, where the contact information from the request is used to obtain the requested information about the contact. In step 1012, the requested information obtained from the database can transmitted to the mobile device 120 via the communication channel (or by SMS or email). In step 1014, the requested information can be received by the ECIM 260.

Figure 11:
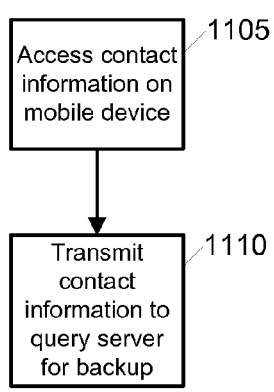
FIG. 11 is a flow diagram of a process for pushing contact information from the mobile device to the query server for backup according to an embodiment.

FIG. 11 is a flow diagram of a process for pushing contact information from the mobile device to the query server for backup according to an embodiment. The steps of the process illustrated in FIG. 11 can be implemented in ECIM 260 (illustrated in FIG. 3) of the mobile device 120 illustrated in FIGS. 1 and 2.

The data backup module 360 can be configured to periodically, or on demand of a user of the mobile device 120, access contact information on the mobile device 120 to be backed upon the query server 160 (step 1105). As described above, the data backup module 360 can provide a user interface that allows a user to request that the contact information on the mobile device be sent to the query server 160 for backup. The contact information can be included in the contact list or phone book of the mobile device as well as the information stored in the contact information data store 340. The data backup module 340 can then transmit the contact information to be backed up to the query server 160 via the network 140 (step 1110). In an embodiment, the data backup module 340 can coordinate with the data controller 270 to transmit the contact information to the query server 160 via the network 140.

Figure 12:
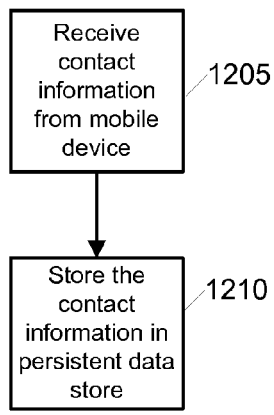
FIG. 12 is a flow diagram of a process for receiving and storing a backup copy of contact information pushed from the mobile device to the query server.

FIG. 12 is a flow diagram of a process for receiving and storing a backup copy of contact information pushed from the mobile device to the query server. The steps of this process can be implemented in the query server 160 illustrated in FIGS. 1 and 4.

The query server 160 can receive contact information from a mobile device to be backed upon the query server 160 (step 1205). The query server 160 can then store the received contact information in a persistent data store, such as data storage area or system 55. The backed up copy of the contact information can be associated with a username, phone number, device id, or other unique identifier that can be used to uniquely identify the backed up contact information. This identifier can be later provided to the query server 160 by a user or mobile device to obtain a copy of the backed up contact information.

Figure 13:
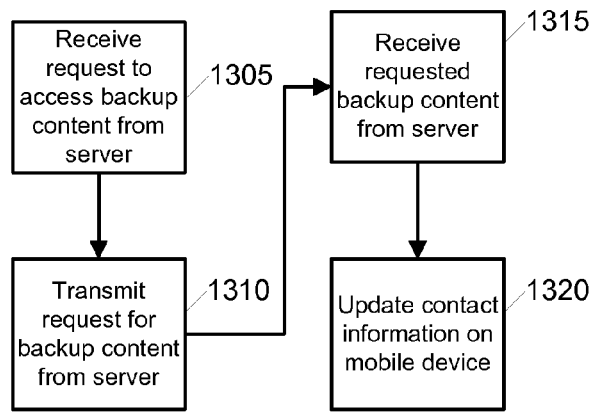
FIG. 13 is a flow diagram of a process for requesting backup information from the query server and for updating the contact information on the mobile device using the backed up information.

FIG. 13 is a flow diagram of a process for requesting backup information from the query server and for updating the contact information on the mobile device using the backed up information. The steps of this process can be implemented in the data update module 380 of ECIM 260 illustrated in FIG. 3 of the mobile device 120 illustrated in FIGS. 1 and 2.

The data update module 380 can send a request to the query server 160 to retrieve backed up contact information that was previously transmitted to the query server 160 for storage (step 1305). In an embodiment, the request can include a unique identifier associated with a user of the mobile device or with the mobile device itself that was associated with the contact information stored on the query server 160. The requested information is received from the server (step 1315) and the contact information on the mobile device 120 can be updated using the data received from the server (step 1320). According to an embodiment, the data update module 380 can update the information stored in the contact list or phone book of the mobile device and/or the contact information in the contact information data store 340 using the information received from the server.

According to an embodiment, the data update module 380 can display a message to the user that the update has been successfully completed if the contact information is received from the query server 160 and the contact information on the mobile device is successfully updated. As described above, the data update module 380 can provide a user interface for resolving conflicts between the data on the mobile device and the data received from the server. In an embodiment, if the request from the server times out or no backup information is found on the server, a message indicating that the request timed out, no backup information was available on the server, or that authentication failed can be displayed to the user on a display of mobile device 120 or an audio message can be played to the user by the mobile device 120.

Figure 14:
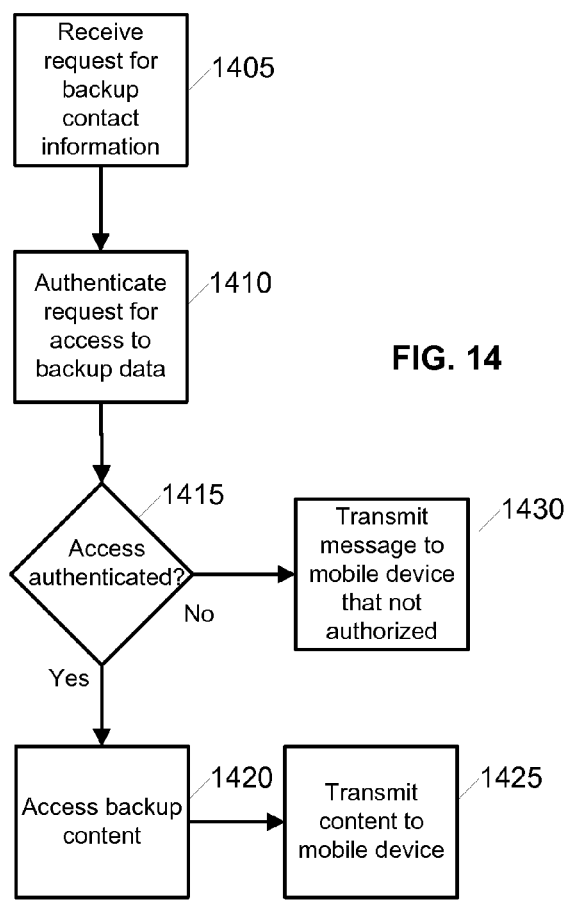
FIG. 14 is a flow diagram of a process for receiving a request for backup information from a mobile device and for providing the requested backup information according to an embodiment.

FIG. 14 is a flow diagram of a process for receiving a request for backup information from a mobile device and for providing the requested backup information according to an embodiment. The steps of this process can be implemented in the query server 160 illustrated in FIGS. 1 and 4.

The query server 160 receives the request for backup data from a mobile device 160 (step 1405). As described above, the request can include a unique identifier associated with a user of the mobile device 120 or associated with the mobile device 120. The query server 160 can authenticate the request for backup data by comparing the received identifier with an identifier associated with backup information stored in the data storage area or system 55 (step 1410). Various authentication methods can be used. For example, in one embodiment, a username and password can be included in the request for backup information sent by the mobile device 120 and the username and password can be authenticated to determine whether the query server 160 should provide backup contact information associated with the user in response to the request. In another embodiment, a unique identifier, such as a personal identification number or password can be provided by the user at the time that a backup is requested in the process illustrated in FIG. 11. This password or PIN can be provided in the request to identify which backup contact information to provide in response to a request. In yet another embodiment, a hardware identifier associated with the mobile device can be associated with the data backed up by the query server 160 and that identifier can be provided with the request from the mobile device 120. In embodiments where a hardware identifier is used but a device is lost or damaged, an administrator may be required to associate a hardware identifier of the new device with the hardware identifier of the old device so that the query server 160 can provide the correct contact information in response to a request for contact information.

A determination is made whether the request can be authenticated (step 1415). If the request cannot be authenticated, the query server 160 can transmit a message to the mobile device 120 that access to the content is denied (step 1430). If the request can be authenticated, the query server 160 can access the backup content stored in the data storage area or system 55 associated with the request (step 1420), and transmit the requested content to the mobile device (step 1425).

FIG. 15 is a flow diagram of a method for collecting call and/or contact information from a mobile device and pushing the data to the query server for analysis according to an embodiment. The steps of this process can be implemented in the data backup module 360 of ECIM 260 illustrated in FIG. 3 of the mobile device 120 illustrated in FIGS. 1 and 2. The call and/or contact information can be analyzed by the query server 160 to develop calling circles or calling clusters, that represent groups of people that may not have been in direct contact with one another but have one or more common contacts which may indicate that these parties are likely to contact each other in the future.

The mobile device 120 can collect call data, such as incoming and outgoing call data, and/or data regarding incoming or outgoing communications of other types, such as email, text messages, etc. (step 1505). This information may be collected automatically by mobile device 120 or the data backup module 360 of ECIM 260 can be configured to collect this information.

A determination can be made whether the user has opted in for the calling circle program since contact information and call information will be transmitted to the server for analysis (step 1510). If the user has not opted in to the service, the mobile device 120 will stop processing the request and not transmit any data to the server (step 1530). This process is separate from the backup processes illustrated in FIGS. 11-14 and will not interfere with the transmission of contact information to the query server 160 for those processes.

If the user has opted in to the service, the data backup module 360 of ECIM 260 can be configured to collect call related information and/or contact information from the contact list and/or the contact information data store 340 (step 1520) and to transmit the collected information to the query server 160 for analysis (step 1525). In some embodiments, the information provided to the query server 160 by the data backup module 360 includes the contact information found in the contact list or phone book of the mobile device and/or the contact information data store 340. In other embodiments, the information can include information about incoming and/or outgoing communications. For example, the data backup module 360 may transmit the incoming and/or outgoing call log information, information about incoming outgoing text, email, or other types of messages. In other embodiments, the data backup module 360 can collect and transmit a combination of one or more of these types of information to the query server 160 for analysis. In some embodiments, the user of the mobile device can opt in to the service and can select which information is provided to the query server 160 for analysis to identify calling circles.

FIG. 16 is a flow diagram of a process for identifying calling circles based on call and/or contact information collected from mobile devices. The steps of this process can be implemented in the contact analysis module 460 of query server 160 illustrated in FIGS. 1 and 4.

The query server 160 can receive contact information and/or call or other communication information from the mobile device 120 (step 1605) and to analyzed the received information to predict which users might potentially call other users (step 1610). In an embodiment, the query server 160 can be configured to store contact information received from a plurality of mobile devices 120 and to analyze the information to identify calling circles or calling clusters that include parties that call one another or send other types communications to one another, such as email messages and text messages. The groups can also include parties that are users of the system and non-users of the system, such as people, businesses, or organizations that are not registered users of system but communicate with users of the system.

A determination is made whether any potential contacts have been identified during the analysis of the contact information provided by the mobile device (step 1615). If no additional contacts are found, the query server 160 can store the received contact and/or calling information the database or storage device 55 for use in analyzing contact and/or communication information received from other mobile devices (step 1650).

If a potential contact or contact is identified that is not already a contact on the mobile device 120, then the contact analysis module 460 can instruct the information application module 420 to perform one or more queries to gather information about the potential contact or contacts (step 1620) and the call and/or contact information received from the mobile device and the information collected by the information application module 420 in the database or storage device 55 (step 1625). The contact analysis module 460 can then push the new contact information to the mobile device 120 via network 140 (step 1630). The data update module 380 update the contact list and/or the contact information data store 340 using the potential contact information pushed by the server to the mobile device 120.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method of providing enhanced information to a mobile communication device regarding a calling device wherein the mobile communication device receives the identifier of a calling device, the method comprising:

receiving a request for information from a mobile communication device over a communication channel, the request including an identifier of a calling device;

accessing a local database and obtaining information related to the request using the identifier of the calling device;

determining whether additional information is required from one or more remote third party data sources;

requesting information related to the request from the one or more remote third party data sources if additional information is required;

receiving response information from the one or more remote third party data sources;

correlating the response information from the third party data sources with information retrieved from the local database to generate a response to the request for information from the mobile communication device; and transmitting the response to the request for information to the mobile communication device via the communication channel.

2. The method of claim 1 wherein the communication channel is a data communication channel.

3. The method of claim 1 wherein the step of requesting information from the one or more remote third party data sources is not performed if information related to the request is available in the local database.

4. The method of claim 1 further comprising:

storing the correlated response information in the local database; and providing the correlated information from the local database in response to a subsequent request for information related to the calling device.

5. An automated mobile intelligent call processing device comprising:

a telephony controller configured to receive an incoming call request from a calling device;

an application programming interface (API) module configured to obtain notification of the incoming call request including the identifier of the calling device, and to generate and forward the notification;

a data controller configured to establish and maintain communication via a communication channel;

a query module coupled to the data controller and configured to receive the notification from the API module, to formulate an information request including the identifier of the calling device, to establish a connection with the data controller to transmit the information request via the communication channel and to receive the obtained requested information via the communication channel, the obtained requested information including customized information related to the calling device;

an off-call query module coupled to the query module and configured to receive the identifier of the calling device from the query module if the data communication channel was unavailable for transmitting the information request, monitor the communication channel for availability, transmit the information request via the communication channel when the communication channel becomes available, receive the requested information via the communication channel, and create an entry in a caller information data store on the device using the requested information received via the communication channel; and a display selector module configured to display information related to a calling party on the device, access the entry in the caller information data store, and display caller information from the entry on the display of the device the next time an incoming call request is received at the device from the calling device.

6. The device of claim 5 wherein the communication channel is a data communication channel.

7. An automated mobile intelligent call processing device comprising:

a telephony controller configured to receive an incoming call request from a calling device;

an application programming interface (API) module configured to obtain notification of the incoming call request including the identifier of the calling device, and to generate and forward the notification;

a data controller configured to establish and maintain communication via a communication channel;

a query module coupled to the data controller and configured to receive the notification from the API module, to formulate an information request including the identifier of the calling device, to establish a connection with the data controller to transmit the information request via the communication channel and to receive the obtained requested information via the communication channel, the obtained requested information including customized information related to the calling device;

an off-call query module coupled to the query module and configured to receive the identifier of the calling device from the query module if the data communication channel was unavailable for transmitting the information request, monitor the communication channel for availability, transmit the information request via the communication channel when the communication channel becomes available, receive the requested information via the communication channel, and create a contact list entry associated with the calling device on the device using the requested information received via the data communication channel; and a display selector module configured to display information related to a calling party on the device, access the contact list entry, and display caller information from the contact list entry on the display of the device the next time an incoming call request is received at the device from the calling device.

8. An automated mobile intelligent call processing system comprising:

a storage device for storing records associated with multiple identifiers;

an information gateway module coupled to the storage device and configured to receive a request for information from a mobile communication device over a communication channel, the request including an identifier of a calling device;

an information application module coupled to the storage device and configured to receive the identifier from the information gateway module, to access the storage device to obtain the requested information, to make a determination whether to access additional information from at least one third party data server, and to access the at least one third party data server if the information application module determines that additional information is necessary to satisfy the request for information, wherein the information application module is configured to correlate the information from the storage device and the additional information from the at least one third party data server to generate the requested information; and a communication module coupled to the information application module and configured to transmit the requested information relating to the calling device via the communication channel.

9. The system of claim 8 wherein the communication channel is a data communication channel.

10. The system of claim 8 wherein the information application module is configured to access the at least one third party data server if the information request is not available in the storage device.

11. The system of claim 8 wherein the information application module is configured to store the correlated information in the storage device and to provide the correlated information from the storage device in response to a subsequent request for information related to the calling device.

12. A method of providing enhanced information to a mobile device regarding a party to a communication with the mobile communication device, the method comprising:

receiving a request for information from a mobile device over a communication channel, the request including an identifier of a contact for whom information is desired;

accessing a local database and obtaining information related to the contact using the identifier from the request;

determining whether additional information is required from one or more remote third party data sources;

requesting information related to the contact from the one or more remote third party data sources if additional information is required;

receiving response information from the one or more remote third party data sources;

correlating the response information from the one or more remote third party data sources with information retrieved from the local database to generate a response to the request for information from the mobile device; and transmitting the response to the request for information to the mobile device via the data communication channel.

13. The method of claim 12 wherein the communication channel is a data channel.

14. The method of claim 12 wherein the step of requesting information from the one or more remote third party data sources is not performed if information related to the request is available in the local database.

15. The method of claim 12 further comprising:

storing the correlated response information in the local database; and providing the correlated information from the local database in response to a subsequent request for information related to the calling device.

* * * * *